US010664927B2

(12) United States Patent
Livshits et al.

(10) Patent No.: US 10,664,927 B2
(45) Date of Patent: May 26, 2020

(54) AUTOMATION OF CROWD-SOURCED POLLING

(71) Applicant: Microsoft Corporation, Redmond, WA (US)

(72) Inventors: Benjamin Livshits, Kirkland, WA (US); Todd Douglas Mytkowicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 14/314,648

(22) Filed: Jun. 25, 2014

(65) Prior Publication Data
US 2015/0379126 A1 Dec. 31, 2015

(51) Int. Cl.
*G06Q 50/00* (2012.01)
*G06Q 30/02* (2012.01)
*G06Q 10/10* (2012.01)

(52) U.S. Cl.
CPC ............. *G06Q 50/01* (2013.01); *G06Q 10/10* (2013.01); *G06Q 30/0203* (2013.01)

(58) Field of Classification Search
None
See application file for complete search history.

(56) References Cited

U.S. PATENT DOCUMENTS

| | | | |
|---|---|---|---|
| 8,170,906 B2 | 5/2012 | Von Schweber et al. | |
| 2005/0273804 A1* | 12/2005 | Preisman | H04H 60/33 725/24 |
| 2012/0246580 A1* | 9/2012 | Bouverat | G06Q 50/01 715/753 |
| 2013/0066961 A1* | 3/2013 | Naik | G06Q 10/10 709/204 |
| 2013/0117037 A1 | 5/2013 | Eichert et al. | |

(Continued)

OTHER PUBLICATIONS

Kazemi, Leyla et al., "GeoTruCrowd: Trustworthy Query Answering with Spatial Crowdsourcing", SIGSPATIAL'13 Nov. 5-8, 2013 and ACM 2013, pp. 1-10.*

(Continued)

*Primary Examiner* — Pierre M Vital
*Assistant Examiner* — Alicia M Antoine
(74) *Attorney, Agent, or Firm* — Medley, Behrens & Lewis, LLC

(57) ABSTRACT

Various technologies described herein pertain to automation of crowd-sourced polling. At least one query can be received. The at least one query includes a request. A poll can be automatically generated based upon the at least one query, where the poll corresponds to the request. The poll can be submitted to a crowdsourcing backend, where instances of the poll are administered on the crowdsourcing backend. Moreover, crowd-sourced responses to the instances of the poll can be retrieved from the crowdsourcing backend. The crowd-sourced responses to the instances of the poll can respectively include crowd-sourced responses to the request. The crowd-sourced responses to the request can be converted to a random variable. An operation can be performed upon the random variable. The operation can include one or more of a statistical analysis (e.g., hypothesis testing), bias correction, an arithmetic operation, expected value computation, standard deviation computation, etc.

20 Claims, 12 Drawing Sheets

(56) References Cited

U.S. PATENT DOCUMENTS

| | | | |
|---|---|---|---|
| 2013/0179237 A1 | 7/2013 | Hull et al. | |
| 2013/0282757 A1* | 10/2013 | Ehsani | G06F 17/30545 707/770 |
| 2013/0339091 A1 | 12/2013 | Humay | |
| 2014/0337102 A1* | 11/2014 | Skoler | G07F 17/323 705/7.32 |
| 2014/0343984 A1* | 11/2014 | Shahabi | G06Q 10/06311 705/7.13 |
| 2015/0220871 A1* | 8/2015 | Rajan | G06Q 10/063112 705/7.14 |

OTHER PUBLICATIONS

Franklin, Michael J., "CrowdDB: Answering Queries with Crowdsourcing", 2011, ACM.*

Singer, Yaron, "Pricing Mechanisms for Crowdsourcing Markets", 2013, World Wide Web Conference Committee (IW3C2), pp. 1157-1166.*

Adam Marcus, "Optimization Techniques for Human Computation-enabled Data Processing Systems", Sep. 2012, Massachusetts Institute of Technology 2012, pp. 1-124.*

Ittai Abraham, Omar Alonso, Vasilis Kandylas, Aleksandrs Slivkins, "Adaptive Crowdsourcing Algorithms for the Bandit Survey Problem", May 20, 2013, arXiv:1302.3268v2 [cs.LG], pp. 1-25.*

Dolstra, Eelco, Raynor Vliegendhart, and Johan Pouwelse, "Crowdsourcing GUI Tests", 2013 IEEE Sixth International Conference on Software Testing, Verification and Validation, pp. 332-341 (Year: 2013).*

Liu, et al., "CDAS: A Crowdsourcing Data Analytics System", Retrieved at: <<http://dl.acm.org/citation.cfm?id=2336676>>, In Proceedings of the VLDB Endowment, vol. 5, Issue 10, Jun. 2012, pp. 1040-1051.

Phuttharak, et al., "LogicCrowd: a Declarative Programming Platform for Mobile Crowdsourcing", Retrieved at: <<http://homepage.cs.latrobe.edu.au/sloke/papers/iucc2013-jurairat.pdf>>, In 12th IEEE International Conference on Trust, Security and Privacy in Computing and Communications, Jul. 16, 2013, 8 pages.

Marcus, et al., "Demonstration of Qurk: A Query Processor for Human Operators", Retrieved at: <<http://dl.acm.org/citation.cfm?id=1989486>>, In Proceedings of the 2011 ACM SIGMOD International Conference on Management of data, Jun. 12, 2011, pp. 1315-1317.

Gao, et al., "An Online Cost Sensitive Decision-Making Method in Crowdsourcing Systems", Retrieved at: <<http://www.comp.nus.edu.sg/~cdas/pdfs/sigra626-gao.pdf>>, In Proceedings of SIGMOD Conference, Jun. 22, 2013, 12 pages.

Feng, et al., "CrowdDB: Query Processing with the VLDB Crowd", Retrieved at: <<http://cs.brown.edu/~kraskat/pub/vldb11-crowddb_demo.pdf>>, In Proceedings of the VLDB Endowment, vol. 4, No. 12, Aug. 29, 2011, 4 pages.

Anderson, et al., "Craigslist Samples of Convenience: Recruiting Hard-to-Reach Populations", Retrieved on: Feb. 8, 2014, 14 Pages. Available at: http://fiesta.bren.ucsb.edu/~sanderson/CraigslistSurvey.pdf.

Andrews, et al., "Electronic Survey Methodology: A Case Study in Reaching Hard-To-Involve Internet Users", Retrieved at: <<http://citeseerx.ist.psu.edu/viewdoc/download?doi=10.1.1.151.94&rep=rep1&type=pdf>>, In International Journal of Human-Computer Interaction, vol. 16, Issue 2, Retrieved on: Feb. 8, 2014, pp. 185-210.

Antin, et al., "Social Desirability Bias and Self-Reports of Motivation: a Study of Amazon Mechanical Turk in the US and India", Retrieved at: <<http://dl.acm.org/citation.cfm?id=2208699>>, In Proceedings of SIGCHI Conference on Human Factors in Computing Systems, May 5, 2012, pp. 2925-2934.

Barowy, et al., "Automan: A Platform for Integrating Human-Based and Digital Computation", Retrieved at: <<http://dl.acm.org/citation.cfm?id=2384663>>, In Conference on Object-Oriented Programming, Systems, Languages, and Applications, Oct. 19, 2012, pp. 639-654.

Behrend, et al., "The Viability of Crowdsourcing for Survey Research", Retrieved at: <<http://download.springer.com/static/pdf/475/art%253A10.3758%252Fs13428-011-0081-0.pdf?auth66=1392199689_7d37f5275cd3a018551d0521f12b16b8&ext=.pdf>>, In Proceedings of Behavior research methods, vol. 43, No. 3, Mar. 25, 2011, pp. 800-813.

Berinsky, et al., "Using Mechanical Turk as a Subject Recruitment Tool for Experimental Research", Retrieved at: <<http://qipsras.uky.edu/sites/default/files/Berinsky.Using%20Mechanical%20Turk%20as%20a%20Subject%20Recruitment%20Tool%20for%20Experimental%20Research.pdf>>, In Political Analysis, Sep. 17, 2010, 27 pages.

Bornholt, et al., "Uncertain<T>: A First-Order Type for Uncertain Data", Retrieved at: <<http://research.microsoft.com/pubs/191276/submit-tr.pdf>>, In ASPOLS, Retrieved on: Mar. 1, 2014, pp. 1-21.

Buhrmester, et al., "Amazon's Mechanical Turk: A New Source of Inexpensive, Yet High-Quality, Data?", Retrieved at: <<http://homepage.psy.utexas.edu/HomePage/Faculty/Gosling/reprints/BuhrmesterKwangGosling_PoPS_inpress.pdf>>, In Perspectives on Psychological Science, vol. 6, Issue 1, Jan. 2011, pp. 1-23.

Buskirk, et al., "Online Surveys Aren't Just for Computers Anymore! Exploring Potential Mode Effects between Smartphone and Computer-Based Online Surveys", Retrieved on: Feb. 11, 2014, 14 pages, Available at: http://www.amstat.org/sections/srms/Proceedings/y2012/Files/400244_500700.pdf.

Callegaro, et al., "Computing Response Metrics for Online Panels", Retrieved at: <<https://www.google.co.in/url?sa=t&rct=j&q=&esrc=s&source=web&cd=2&cad=rja&ved=0CC4QFjAB&url=http%3A%2F%2Fwww.researchgate.net%2Fpublication%2F31283470_Computing_Response_Metrics_for_Online_Panels%2Ffile%2F72e7e520cde7618ef7.pdf&ei=vL75UtqTNMbDrAfVjYGgBw&usg=AFQjCNHsjyluxuP4-Lr9fzvURr_gwBfUyQ&bvm=bv.61190604,d.bmk>>, In Proceedings of Public Opinion Quarterly, vol. 72, No. 5, Jan. 2008, pp. 1008-1032.

Cheney, et al., "A Practical Theory of Language-Integrated Query", Retrieved at: <<http://dl.acm.org/citation.cfm?id=2500586>>, In Proceedings of the 18th ACM SIGPLAN International Conference on Functional Programming, Sep. 25, 2013, pp. 403-416.

Couper, Mick P., "Designing Effective Web Surveys", Published on: Sep. 1, 2008, 13 pages, Available at: http://www.langtoninfo.com/web_content/9780521889452_frontmatter.pdf.

Couper, Mick P., "Web Surveys: A Review of Issues and Approaches", Retrieved at: <<http://www2.uni-frankfurt.de/47929851/Couper_2000.pdf>>, In Public Opinion Quarterly, vol. 64, Jan. 2000, pp. 464-494.

Curmi, et al., "On-line Sharing of Live Biometric Data for Crowd-Support: Ethical Issues from System Design", Retrieved on: Feb. 11, 2014, 6 pages, Availabale at: http://www.responsible-innovation.org.uk/torrii/sites/default/files/Realtime%20Crowd%20Support.pdf.

Dalvi, et al., "Probabilistic Databases: Diamonds in the Dirt", Retrieved at: <<http://dl.acm.org/citation.cfm?id=1538810>>, In Proceedings of Communications of the ACM, vol. 52, Issue 7, Jul. 2009, pp. 86-94.

Dillman, et al., "Principles for constructing Web surveys", Retrieved at: <<http://134.121.51.35/dillman/papers/1998/PrinciplesforConstructingWebSurveys.pdf>>, In Joint Meetings of the American Statistical Association, Retrieved on: Feb. 11, 2014, 16 pages.

Duffy, et al., "Comparing Data from Online and Face-to-Face Surveys", Retrieved at: <<http://yjfagnf.m-public.com/Assets/Docs/Archive/Publications/comparing-data.pdf>>, In International Journal of Market Research vol. 47, Issue 6, Retrieved on: Feb. 11, 2014, pp. 615-639.

Erceg-Hurn, et al., "Modern Robust Statistical Methods: An Easy Way to Maximize the Accuracy and Power of Your Research", Retrieved at: <<http://psych.colorado.edu/~willcutt/pdfs/Erceg_Hurn_2008.pdf>>, In Proceedings of American Psychological Association, vol. 63, Issue 7, Oct. 2008, pp. 591-601.

(56) References Cited

OTHER PUBLICATIONS

Evans, et al., "The Value of Online Surveys", Retrieved at: <<http://shlee.myweb.uga.edu/onlinesurvey/valueofonlinesurveys.pdf>>, In Proceedings of Internet Research, vol. 15, No. 2, Apr. 26, 2005, pp. 195-219.

Eysenbach, et al., "Using the Internet for Surveys and Health Research", Retrieved at: <<ucsf.org/ticr/syllabus/courses/2/2007/03/06/lecture/readings/usinginternetresearch.pdf>>, In Journal of Medical Internet Research, vol. 4, Issue 2, Nov. 22, 2002, 9 pages.

Fort, et al., "Amazon Mechanical Turk: Gold Mine or Coal Mine?", Retrieved at: <<http://dl.acm.org/citation.cfm?id=2000527>>, In Journal of Computational Linguistics, vol. 37, Issue 2, Jun. 2011, 8 pages.

Franklin, et al., "Crowd DB: Answering Queries with Crowdsourcing", Retrieved at: <<http://csce.uark.edu/~tingxiny/courses/5013spring13/readingList/crowddb_sigmod2011.pdf>>, In Proceedings of the ACM SIGMOD International Conference on Management of Data, Jun. 12, 2011, 12 pages.

Fricker, et al., "An Experimental Comparison of Web and Telephone Surveys", Retrieved at: <<http://www.irss.unc.edu/content/pdf/fricker%20poq%202005%20experimental%20comparison.pdf>>, In Proceedings of Public Opinion Quarterly, vol. 69, Issue 3, Sep. 2005, pp. 370-392.

Fuchs, et al., "The Coverage Bias of Mobile Web Surveys Across European Countries", Retrieved at: <<http://5.9.69.25/www-ijis-net/ijis4_1/ijis4_1_fuchs.pdf>>, In International Journal of Internet Science, vol. 4, Issue 1, Retrieved on: Feb. 10, 2014, pp. 21-33.

Gordon, et al., "Tabular: A Schema-Driven Probabilistic Programming Language", Retrieved at: <<http://research.microsoft.com/pubs/204661/MSR-TR-2013-118.pdf>>, In Technical Report MSR-TR-2013-118, Published on: Dec. 17, 2013, 25 pages.

Gosling, et al., "Should We Trust Web-Based Studies? A Comparative Analysis of Six Preconceptions About Internet Questionnaires", Retrieved at: <<http://ww.w.simine.com/docs/Gosling_et_al_AP_2004.pdf>>, In American Psychological Association, vol. 59, No. 2, Feb. 2004, pp. 93-104.

Grust, et al., "Avalanche-Safe LINQ Compilation", Retrieved at: <<http://dl.acm.org/citation.cfm?id=1920866>>, In Proceedings of the VLDB Endowment, vol. 3, Issue 1-2, Sep. 2010, pp. 162-172.

Gunn, Holly, "Web-Based surveys: Changing the Survey Process", Published on: Dec. 2, 2002, 12 pages, Available at: http://ojphi.org/ojs/index.php/fm/article/view/1014/935.

Hanley, et al., "Statistical Analysis of Correlated Data Using Generalized Estimating Equations: An Orientation", Retrieved at: <<http://aje.oxfordjournals.org/content/157/4/364.full.pdf>>, In American Journal of Epidemiology, vol. 157, No. 4, Feb. 15, 2003, pp. 364-375.

Henrich, et al., "The Weirdest People in the World?", Retrieved at: <<http://www2.psych.ubc.ca/~henrich/pdfs/WeirdPeople.pdf>>, In Journal of Behavioral and Brain Sciences, vol. 33, Issue 2-3, Published on: Jun. 2010, pp. 1-75.

"Using Online Surveys in Your Marketing", Retrieved on: Feb. 11, 2014, 43 pages, Available at: http://www.yieldopedia.com/paneladmin/reports/0c9_677cb579721a978047db36a11f24.pdf.

Ipeirotis, Panos, "Demographics of Mechanical Turk", Published on: Mar. 2010, 14 pages, Available at: http://archive.nyu.edu/fda/bitstream/2451/29585/2/CeDER-10-01.pdf.

Ipeirotis, Panagiotis G., "Analyzing the Amazon Mechanical Turk Marketplace", Retrieved at: <<http://archive.nyu.edu/fda/bitstream/2451/29801/4/CeDER-10-04.pdf>>, In ACM Magazine of XRDS: Crossroads, vol. 17, Issue 2, Dec. 1, 2010, 13 pages.

Slovak, et al., "Understanding Heart Rate Sharing: Towards Unpacking Physiosocial Space", Retrieved at: <<http://dl.acm.org/citation.cfm?id=1386812>>, In Proceedings of the SIGCHI Conference on Human Factors in Computing Systems, May 5, 2012, pp. 859-868.

Jurca, et al., "Incentives for Expressing Opinions in Online Polls", Retrieved at: <<http://dl.acm.org/citation.cf?id=1386812>>, In Proceedings of the 9th ACM Conference on Electronic Commerce, Jul. 8, 2008, pp. 119-128.

Kapelner, et al., "Preventing Satisficing in Online Surveys: A "Kapcha" to Ensure Higher Quality Data", Retrieved at: <<http://www.danachandler.com/files/kapcha.pdf>>, In Crowd Conference, Oct. 4, 2010, 10 pages.

Keeter, Scott, "The Impact of Cell Phone Non-Coverage Bias on Polling in the 2004 Presidential Election", Retrieved at: <<http://pollcats.net/downloads/Cell%20phones%20and%20election%202004%20revised%208-1-05.pdf>>, In Public Opinion Quarterly, vol. 70, Issue 1, Aug. 1, 2005, 16 pages.

Keeter, et al., "A Comparison of Results from Surveys by the Pew Research Center and Google Consumer Surveys", Retrieved at: <<http://www.people-press.org/files/legacy-pdf/11-7-12%20Google%20Methodology%20paper.pdf>>, In Pew Research Center, Nov. 7, 2012, 30 pages.

Kittur, et al., "Crowdsourcing user Studies with Mechanical Turk", Retrieved at: <<http://dl.acm.org/citation.cfm?id=1357127>>, In Proceedings of the SIGCHI Conference on Human Factors in Computing Systems, Apr. 5, 2008, pp. 453-456.

Kittur, et al., "CrowdWeaver: Visually Managing Complex Crowd Work", Retrieved at: <<http://paul.is/pubs/crowdweaver-cscw2012.pdf>>, In Computer Supported Cooperative Work, Feb. 11, 2012, 4 pages.

Kosara, et al., "Do Mechanical Turks Dream of Square Pie Charts?", Retrieved at: <<http://dl.acm.org/citation.cfm?id=2110202>>, In Proceedings of the 3rd BELIV Workshop: Beyond Time and Errors: Novel Evaluation Methods for Information Visualization, Apr. 10, 2010, pp. 63-70.

Kraut, et al., "Psychological Research Online Report of Board of Scientific Affairs' Advisory Group on the Conduct of Research on the Internet", Retrieved at: <<http://facelab.org/bcjones/Teaching/files/Kraut_2004.pdf>>, In American Psychologist, Feb. 2004, pp. 105-117.

Kittur, et al., "Crowd Forge: Crowdsourcing Complex Work", Retrieved at: <<http://dl.acm.org/citation.cfm?id=2047202>>, In Proceedings of the 24th annual ACM Symposium on User Interface Software and Technology, Oct. 16, 2011, pp. 43-52.

Kruschke, John K., "Doing Bayesian Data Analysis: A Tutorial with R and BUGS", Retrieved at: <<http://faculty.washington.edu/jmiyamot/p548/kruschkejk%20bayesian%20data%20analysis.ch01-06.pdf>>, In Academic Press, Nov. 10, 2010, 119 pages.

Kruschke, John K., "What to Believe: Bayesian Methods for Data Analysis", Retrieved at: <<http://indiana.edu/~kruschke/articles/Kruschke2010TiCS.pdf>>, In Trends in Cognitive Sciences, vol. 14, Issue 7, Jul. 2010, pp. 293-300.

uSamp, "Panel Book 2013", The Answer Network, pp. 1-20.

Wright, Kevin B., "Researching Internet-Based Populations: Advantages and Disadvantages of Online Survey Research, Online Questionnaire Authoring Software Packages, and Web Survey Services", Journal of Computer-Mediated Communication, 2005, 19 pages.

White, Ryen W., "Beliefs and Biases in Web Search", Retrieved at: <<http://research.microsoft.com/en-us/um/people/ryenw/papers/WhiteSIGIR2013.pdf>>, In Proceedings of 36th International ACM SIGIR Conference on Research and Development in Information Retrieval, Jul. 28, 2013, 10 pages.

Chandler, et al., "Methodological Concerns and Advanced Uses of Crowdsourcing in Psychological Research" Retrieved on Jun. 26, 2014, 45 pages, Available at: http://www.jessechandler.com/uploads/2/8/0/5/2805897/mturk_adv_methods.pdf.

Cooper, et al., "Evaluating the College Sophomore Problem: The Case of Personality and Politics", Retrieved at: <<http://paws.wcu.edu/mccord/pdf/Cooper-McCord-Socha-Jop-2011.pdf>>, In the Journal of Psychology, vol. 145, Issue 1, 2011, pp. 23-37.

Nevarez, Benjamin, "Inside the SQL Server Query Optimizer", Retrieved at: <<http://iselgsi.googlecode.com/svn/trunk/Bibliografia/Inside%20the%20SQL%20Server%20Query%20Optimizer.pdf>>, In Red Gate Books, 2011, 265 pages.

Wyatt, Jeremy C., "When to Use Web-Based Surveys", Retrieved at: <<http://www.ncbi.nlm.nih.gov/pmc/articles/PMC61446/pdf/0070426.pdf>>, In Journal of the American Medical Informatics Association, vol. 7, No. 4, Aug. 2000, pp. 426-430.

(56) References Cited

OTHER PUBLICATIONS

Kruschke, John K., "Bayesian Estimation Supersedes the t Test", Retrieved at: <<http://psy-ed.wdfiles.com/local--files/start/Kruschke2012.pdf>>, In Journal of Experimental Psychology: General, May 31, 2012, pp. 1-33.

Kulkarni, et al., "Collaboratively Crowdsourcing Workflows with Turkomatic", Retrieved at: <<http://dl.acm.org/citation.cfm?id=2145354>>, In Proceedings of the ACM Conference on Computer Supported Cooperative Work, Feb. 11, 2012, pp. 1003-1012.

Kulkarni, et al., "Turkomatic: Automatic Recursive Task and Workflow Design for Mechanical Turk", Retrieved at: <<http://dl.acm.org/citation.cfm?id=1979865>>, In CHI Extended Abstracts on Human Factors in Computing Systems, May 7, 2011, pp. 2053-2058.

Lee, Sunghee, "Propensity Score Adjustment as a Weighting Scheme for Volunteer Panel Web Surveys", Retrieved at: <<http://www.jos.nu/Articles/article.asp>>, In Journal of Official Statistics, vol. 22, Issue 2, Jan. 2006, pp. 329-349.

Little, et al., "TurKit: Tools for Iterative Tasks on Mechanical Turk", Retrieved at: <<http://dl.acm.org/citation.cfm?id=1600159>>, In Proceedings of the ACM SIGKDD Workshop on Human Computation, Jun. 28, 2009, pp. 29-30.

Loosveldt, et al., "An Evaluation of the Weighting Procedures for an Online Access Panel Survey", Retrieved at: <<http://jwolf-ra.wdfiles.com/local--files/web-panels/EvalWeightingProcOnlinePanelSurvey_2008.pdf>>, In Survey Research Methods, vol. 2, Issue 2, Jan. 2008, pp. 93-105.

Lumley, Thomas, "Analysis of Complex Survey Samples", Retrieved at: <<http://www.jstatsoft.org/v09/a08/paper?origin=publication_detail>>, In Journal of Statistical Software, Apr. 15, 2004, pp. 1-19.

Marcus, et al., "Counting with the Crowd", Retrieved at: <<http://dl.acm.org/citation.cfm?id=2448944>>, In Proceedings of the VLDB Endowment, vol. 6, Issue 2, Dec. 2012, pp. 109-120.

Marcus, et al., "Crowdsourced Databases: Query Processing with People", Retrieved at: <<http://db.csail.mit.edu/pubs/mturk-cameraready.pdf>>, In Proceedings of the 5th Biennial Conference on Innovative Data Systems Research, Jan. 9, 2011, 4 pages.

Marcus, et al., "Human-Powered Sorts and Joins", Retrieved at: <<http://dl.acm.org/citation.cfm?id=2047487>>, In Proceedings of the VLDB Endowment, vol. 5, Issue 1, Aug. 27, 2011, pp. 13-24.

Mason, et al., "Conducting Behavioral Research on Amazon's Mechanical Turk", Retrieved at: <<http://smash.psych.nyu.edu/courses/spring12/lhc/readings/SSRN-id1691163.pdf>>, In Behavior Research Methods, vol. 44, Issue 1, Mar. 2012, pp. 1-21.

McDonald, et al., "Comparing Google Consumer Surveys to Existing Probability and Non-Probability Based Internet Surveys", Retrieved at: <<http://www.google.com/insights/consumersurveys/static/consumer_surveys_whitepaper.pdf>>, In Google Whitepaper, Apr. 16, 2012, pp. 1-14.

McSherry, Frank, "Privacy Integrated Queries: An Extensible Platform for Privacy-Preserving Data Analysis", Retrieved at: <<http://dl.acm.org/citation.cfm?id=1559850>>, In Proceedings of the ACM SIGMOD International Conference on Management of Data, Jun. 29, 2009, pp. 19-30.

Minder, et al., "CrowdManager—Combinatorial Allocation and Pricing of Crowdsourcing Tasks with Time Constraints", Retrieved at: <<http://yiling.seas.harvard.edu/sc2012/Minder_et_al_CrowdManager_SCUGC_2012.pdf>>, In Workshop on Social Computing and User Generated Content, Jun. 7, 2012, pp. 1-18.

Mo, et al., "Optimizing Plurality for Human Intelligence Tasks", Retrieved at <<http://dl.acm.org/citation.cfm?id=2505755>>, In Proceedings of the 22nd ACM International Conference on Conference on Information & Knowledge Management, Oct. 27, 2013, pp. 1929-1938.

Murray, et al., "Steno: Automatic Optimization of Declarative Queries", Retrieved at: <<http://dl.acm.org/citation.cfm?id=1993513>>, In Proceedings of the Conference on Programming Language Design and Implementation, Jun. 4, 2011, pp. 121-131.

Nerella, et al., "An Approach for Optimization of Object Queries on Collections Using Annotations", Retrieved at: <<http://ieeexplore.ieee.org/xpls/abs_all.jsp?arnumber=6498475>>, In Proceedings of the 17th European Conference on Software Maintenance and Reengineering, Mar. 5, 2013, pp. 273-282.

Oppenheimer, et al., "Instructional Manipulation Checks: Detecting Satisficing to Increase Statistical Power", Retrieved at: <<http://peoplescience.org/sites/default/files/OppenheimerMeyvisDavidenko.2009.pdf>>, In Journal of Experimental Social Psychology, vol. 45, Issue 4, Jul. 2009, pp. 867-872.

Paolacci, et al., "Running Experiments on Amazon Mechanical Turk", Retrieved at: <<http://citeseerx.ist.psu.edu/viewdoc/download;jsessionid=B3DC95F137F219E44D8E65CD0921524E?doi=10.1.1.296.2952&rep=rep1&type=pdf>>, In Judgment and Decision Making, vol. 5, No. 5, Aug. 2010, pp. 411-419.

"Demographics of Internet users", Published on: Sep. 2013, 1 page, Available at: http://pewinternet.org/Trend-Data-(Adults)/Whos-Online.aspx.

Phillips, et al., "Sample Selection Bias and Presence-Only Distribution Models: Implications for Background and Pseudo-Absence Data", Retrieved at: <<http://www.cs.princeton.edu/~mdudik/PhillipsEtAl09.pdf>>, In Journal of Ecological Applications, vol. 19, Issue 1, Jan. 2009, pp. 181-197.

Podsakoff, et al., "Common Method Biases in Behavioral Research: A Critical Review of the Literature and Recommended Remedies", Retrieved at: <<http://psych.colorado.edu/~willcutt/pdfs/Podsakoff 2003.pdf>>, In Journal of Applied Psychology, vol. 88, Issue 5, Oct. 2003, pp. 879-903.

Ramo, et al., "Reaching Young Adult Smokers Through the Internet: Comparison of three Recruitment Mechanisms", Retrieved at: <<http://www.ncbi.nlm.nih.gov/pmc/articles/PMC2893296/pdf/ntq086.pdf>>, In Nicotine & Tobacco Research, vol. 12, No. 7, Jun. 7, 2010, pp. 768-775.

Ramo, et al., "Reliability and Validity of Self-Reported Smoking in an Anonymous Online Survey with Young Adults", Retrieved at: <<http://europepmc.org/articles/PMC3202069?pdf=render>>, In Health Psychology, vol. 30, Issue 6, Nov. 2011, pp. 1-17.

Roshwalb, et al., "Towards the Use of Bayesian Credibility Intervals in Online Survey Results", Retrieved at: <<http://www.ipsos.com/public-affairs/sites/www.ipsos.com.public-affairs/files/IpsosPA_POV_BayesianCredibilityIntervals.pdf>>, In IPSOS Public Affairs, Feb. 10, 2014, 9 pages.

Ross, et al., "Who are the Crowdworkers?: Shifting Demographics in Mechanical Turk", Retrieved at: <<http://www.ics.uci.edu/~jwross/pubs/RossEtAl-WhoAreTheCrowdworkers-altCHI2010.pdf>>, In Proceedings of the Extended Abstracts on Human Factors in Computing Systems, Apr. 10, 2010, pp. 2863-2872.

Salganik, et al., "Wiki Surveys: Open and Quantifiable Social Data Collection", Retrieved at: <<http://arxiv.org/pdf/1202.0500v1.pdf>>, In Computing Research Repository, Feb. 2, 2012, pp. 1-29.

Sax, et al., "Assessing Response Rates and Nonresponse Bias in Web and Paper Surveys", Retrieved at: <<http://illume.arizona.edu/sites/illume.arizona.edu/files/nonrespbiast.pdf>>, In Research in Higher Education, vol. 44, Issue 4, Aug. 2003, pp. 409-432.

Schmidt, Lauren A., "Crowdsourcing for Human Subjects Research", Retrieved at: <<http://www.crowdconf2010.com/images/finalpapers/schmidt.pdf>>, In Proceedings of CrowdConf, Oct. 4, 2010, 7 pages.

Schonlau, et al., "Selection Bias in Web Surveys and the Use of Propensity Scores", Retrieved at: <<http://www.schonlau.net/publication/09schonlau_SRM.pdf>>, In Sociological Methods & Research, vol. 37, Issue 3, Feb. 2009, pp. 1-42.

Schueller, et al., "Stream Fusion using Reactive Programming, LINQ and Magic Updates", Retrieved at: <<http://isif.org/fusion/proceedings/fusion2013/html/pdf/Thursday,%2011%20July%202013/13.10-14.50/37.Special%20SessionAdaptive%20Sensor%20%20Barbaros%20%20B/3-182_015%20Stream%20Fusion.pdf>, In Proceedings of the International Conference on Information Fusion, Jan. 2013 8 pages.

Sills, et al., "Innovations in Survey Research: An Application of Web-Based Surveys", Retrieved at: <<http://libres.uncg.edu/ir/uncg/f/S_Sills_Innovations_2002.pdf>>, In Social Science Computer Review, vol. 20, Issue 1, Feb. 10, 2014, 7 pages.

Sinclair, et al., "Comparison of Response Rates and Cost-Effectiveness for a Community-Based Survey: Postal, Internet and

(56) References Cited

OTHER PUBLICATIONS

Telephone Modes with Generic or Personalised Recruitment Approaches", Retrieved at: <<http://download.springer.com/static/pdf/378/art%253A10.1186%252F1471-2288-12-132.pdf?auth66=1392218828_adb67afa6dded66e29aff16644cc7c26&ext=.pdf>>, In BMC Medical Research Methodology, Jan. 2012, pp. 1-8.

Sparrow, Nick, "Developing Reliable Online Polls", Retrieved at: <<http://www.icmresearch.com/white-papers/developing-reliable-online-polls.pdf>>, In Proceeding of International Journal of Market Research, vol. 48, Issue 6, Retrieved on: Feb. 10, 2014, 23 pages.

Sproul, Robin, "Exit Polls: Better or Worse Since the 2000 Election?", Retrieved at: <<http://shorensteincenter.org/wp-content/uploads/2012/03/d42_sproul.pdf>>, In Discussion Paper Series, Retrieved on: Feb. 10, 2014, 41 pages.

Sprouse, Jon, "A Validation of Amazon Mechanical Turk for the Collection of Acceptability Judgments in Linguistic Theory", Retrieved at: <<http://www.ncbi.nlm.nih.gov/pmc/articles/PMC3048456/pdf/13428_2010_Article_39.pdf>>, In Behavior Research Methods, Nov. 25, 2010, pp. 155-167.

Stephenson, et al., "Studying political behavior: A comparison of Internet and Telephone Surveys", Retrieved at: <<http://ijpor.oxfordjournals.org/content/23/1/24.full.pdf+html>>, In International Journal of Public Opinion Research, vol. 23, No. 1, Dec. 10, 2010, pp. 24-55.

Swan, Melanie, "Crowdsourced Health Research Studies: An Important Emerging Complement to Clinical Trials in the Public Health Research Ecosystem", Retrieved at: <<http://www.ncbi.nlm.nih.gov/pmc/articles/PMC3376509/?report=printable>>, In Journal of Medical Internet Research, Mar. 7, 2012, 20 pages.

Swan, Melanie, "Scaling Crowdsourced Health Studies : The Emergence of a New Form of Contract Research Organization", Retrieved at: <<http://genomera.com/downloads/genomera_201203_personalized_medicine.pdf>>, In Personalized Medicine, vol. 9, Issue 2, Jan. 2012, pp. 223-234.

Sweeney, Latanya, "K-Anonymity: A Model for Protecting Privacy", Retrieved at: <<http://arbor.ee.ntu.edu.tw/archive/ppdm/Anonymity/SweeneyKA02.pdf>>, In International Journal on Uncertainty, Fuzziness and Knowledge-based Systems, vol. 10, Issue 5, Oct. 2002, pp. 1-14.

Tawalare, et al., "Query Optimization to Improve Performance of the Code Execution", Retrieved at: <<http://www.iiste.org/Journals/index.php/CEIS/article/view/978/898>>, In Computer Engineering and Intelligent Systems, vol. 3, No. 1, Retrieved on: Feb. 10, 2014, pp. 44-52.

Truong, et al., "Programming Hybrid Services in the Cloud", Retrieved at: <<http://www.infosys.tuwien.ac.at/Staff/sd/papers/ICSOC%202012%20H.L.%20Truong%20Programming%20Hybrid.pdf>>, In Service-Oriented Computing, Nov. 12, 2012, pp. 96-110.

Tversky, et al., "The Framing of Decisions and the Psychology of Choice", Retrieved at: <<http://psych.hanover.edu/classes/cognition/papers/tversky81.pdf>>, In Proceedings of Science, New Series, vol. 211, No. 4481, Jan. 30, 1981, 7 pages.

Vella, Francis, "Estimating Models with Sample Selection Bias: A Survey", Retrieved at: <<http://faculty.smu.edu/millimet/classes/eco7377/papers/vella.pdf>>, In Journal of Human Resources, vol. 33, Issue 1, Jan. 1998, pp. 127-169.

Wauthier, et al., "Bayesian Bias Mitigation for Crowdsourcing", Retrieved at: <<http://www.stats.ox.ac.uk/~wauthier/wauthier-jordan-nips12.pdf>>, In Advances in Neural Information Processing Systems 24: 25th Annual Conference on Neural Information Processing Systems, Dec. 12, 2011, pp. 1-9.

Winship, et al., "Sampling Weights and Regression Analysis", Retrieved at: <<http://scholar.harvard.edu/files/cwinship/files/sampling_weights.pdf>>, In Proceedings of Sociological Methods Research, vol. 23, No. 2, Nov. 1, 1994, pp. 230-257.

Yeager, et al., "Comparing the Accuracy of RDD Telephone Surveys and Internet Surveys Conducted with Probability and Non-Probability Samples", Retrieved at: <<https://sites.sas.upenn.edu/sites/default/files/mleven/files/krosnick_poq.pdf>>, In Proceedings of Public Opinion Quarterly, Oct. 2011, 39 pages.

Berinsky, et al., "Evaluating Online Labor Markets for Experimental Research: Amazon.com's Mechanical Turk", Retrieved at: <<http://pan.oxfordjournals.org/>>, In Political Analysis Advance Access, Mar. 2, 2012, pp. 1-18.

Bleja, et al., "Optimization of Object-Oriented Queries through Rewriting Compound Weakly Dependent Subqueries", Retrieved at: <<http://202.154.59.182/mfile/files/Information%20System/Databas%20and%20Expert%20Systems%20Applications%3B%20Part%201%2021st%20DEXA%202010/Chapter%2027%20Optimization%20of%20Object-Oriented%20Queries%20through%20Rewriting%20Compound%20Weakly%20Dependent%20Subqueries.pdf>>, In Lecture Notes in Computer Science, vol. 6261, 2010, pp. 323-330.

Bourguignon, et al., "Selection Bias Corrections Based on the Multinomial Logit Model: Monte-Carlo Comparisons", Retrieved at: <<ftp://repec-pse.ens.fr/pse/abstracts/wp200420.pdf>>, In Journal of Economic Surveys, Sep. 6, 2004, 32 pages.

\* cited by examiner

| Height survey (cm) | |
| --- | --- |
| Requester: | John Doe |
| HIT Expiration: | Aug 3, 2014, 9:46 PM PDT |
| Reward: | $0.10 |
| Assignments Requested: | 200 |
| Description: | Height Survey (cm) |

What is your gender?

Male ▾

What is your height, in centimeters?

FIG. 7

AUTOMATION OF CROWD-SOURCED POLLING

BACKGROUND

Online polls have recently become more commonly used to assess properties of a general population. Online polls are commonly conducted for a range of assessments pertaining to marketing studies, product development, political polls, customer satisfaction surveys, medical questionnaires, and so forth. Online polls are widely recognized as an affordable alternative to in-person surveys, telephone polls, or face-to-face interviews.

A wide audience group can be reached utilizing online polls. Further, online polls can enable obtaining answers to questions that people may not be comfortable responding to in a face-to-face setting. A number of conventional services and tools enable online polls to be conducted.

SUMMARY

Described herein are various technologies that pertain to automation of crowd-sourced polling. At least one query can be received. The at least one query includes a request. Further, a poll can be automatically generated based upon the at least one query, where the poll corresponds to the request. The poll can be submitted to a crowdsourcing backend, where instances of the poll are administered on the crowdsourcing backend. Moreover, crowd-sourced responses to the instances of the poll can be retrieved from the crowdsourcing backend. The crowd-sourced responses to the instances of the poll can respectively include crowd-sourced responses to the request. The crowd-sourced responses to the request can be converted to a random variable. Moreover, an operation can be performed upon the random variable.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 7 illustrates an exemplary graphical user interface depicting an instance of a poll.

DETAILED DESCRIPTION

Figure 1:
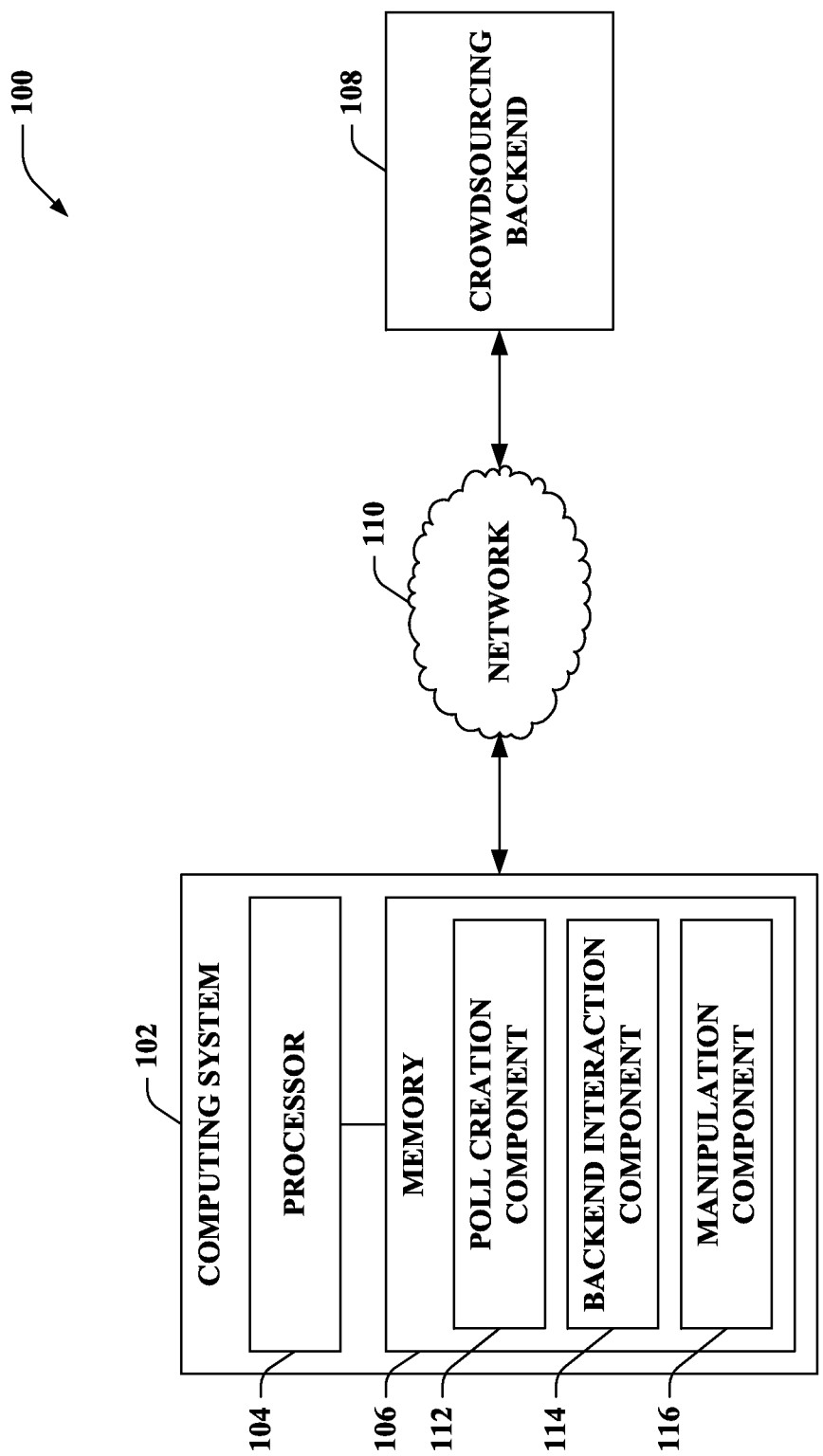
FIG. 1 illustrates a functional block diagram of an exemplary system that administers crowd-sourced polling.

Various technologies pertaining to automation of crowd-sourced polling are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that administers crowd-sourced polling. The system 100 includes a computing system 102. The computing system 102 includes a processor 104 and a memory 106. The processor 104 is configured to execute instructions loaded into the memory 106 (e.g., one or more components loaded into the memory 106 are executable by the processor 104). As described in greater detail herein, the memory 106 includes instructions configured to automate crowd-sourced polling.

According to various examples, the computing system 102 can be or include a computing device. Pursuant to various illustrations, the computing device can be a desktop computing device, a mobile computing device (e.g., a laptop computing device, a mobile telephone, a tablet computing device, a wearable computing device, a handheld computing device, a portable gaming device, a personal digital assistant, etc.), a gaming console, an in-vehicle communications and infotainment system, or the like. In accordance with other examples, the computing system 102 can be or include one or more server computing devices. For instance, the computing system 102 can be or include one or more datacenters, where a datacenter includes a plurality of server computing devices. Additionally or alternatively, the computing system 102 can be a distributed computing system.

Figure 3:
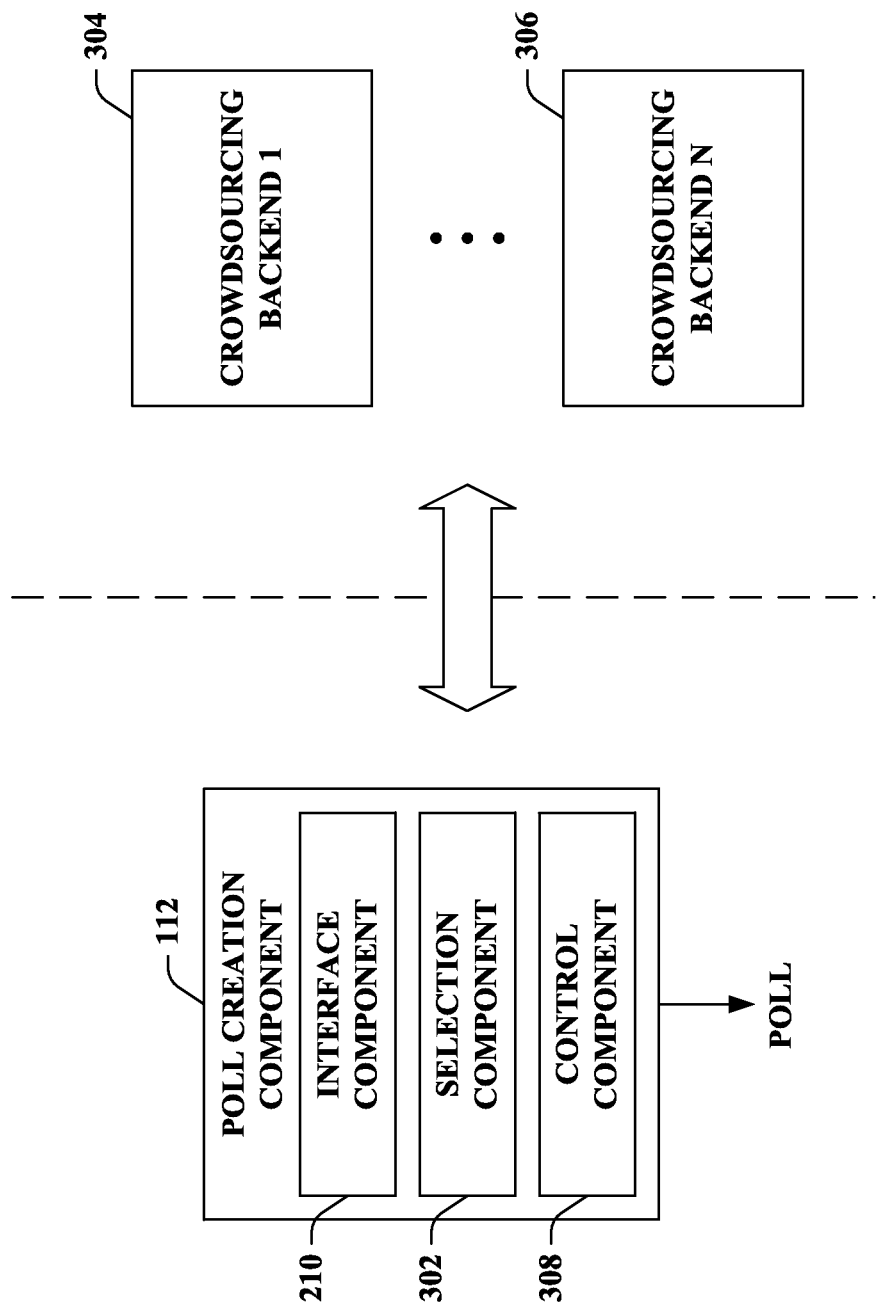
FIG. 3 illustrates a functional block diagram of an exemplary poll creation component.

The system 100 further includes a crowdsourcing backend 108 that is in communication with the computing system 102 by way of a network 110. The network 110 can be the Internet, a cellular network, a campus network, a wide area network, a combination thereof, or the like. It is contemplated that the system 100 can include substantially any number of crowdsourcing backends (as shown in FIG. 3) that can be in communication with the computing system 102 by way of the network 110, where each of the crowdsourcing backends can be similar to the crowdsourcing backend 108.

The crowdsourcing backend 108 is a crowdsourcing marketplace that enables requesters to coordinate use of human intelligence to perform tasks. Requesters and workers can join the crowdsourcing backend 108. A requester can post a task, known as a human intelligence task (HIT), on the crowdsourcing backend 108. Moreover, a worker can browse amongst existing tasks posted on the crowdsourcing backend 108 and complete a task, oftentimes in exchange for a monetary payment set by a requester of the task.

The memory 106 of the computing system 102 includes instructions configured to automate polling administered on the crowdsourcing backend 108. More particularly, the memory 106 of the computing system 102 includes a poll creation component 112 that automatically generates a poll for the crowdsourcing backend 108 based upon at least one query. While many of the examples set forth herein describe the poll creation component 112 creating the poll based upon a query, it is contemplated that such examples can be extended to scenarios where the poll creation component 112 generates the poll based upon a plurality of queries. Moreover, it is also to be appreciated that the poll creation component 112 can generate more than one poll based upon a query (or a plurality of queries).

The poll includes an electronic data structure formed by the poll creation component 112. The poll creation component 112 can tailor the electronic data structure of the poll to a format used by the crowdsourcing backend 108 (e.g., differing formats can be used by differing crowdsourcing backends). For instance, the electronic data structure can have a format that can be used with an application programming interface (API) of the crowdsourcing backend 108, thereby enabling the poll to be provided to and administered on the crowdsourcing backend 108 (e.g., the poll can be posted as a task on the crowdsourcing backend 108, the poll can be completed by a specified number of workers of the crowdsourcing backend 108).

The poll creation component 112 can receive the query, where the query includes a request. Moreover, the poll generated by the poll creation component 112 based upon the query corresponds to the request (e.g., the poll can include the request). For an instance of the poll conducted on the crowdsourcing backend 108 by a given worker, the request can be output to a computing device of the given worker to prompt for entry of a response to the request; thus, the crowdsourcing backend 108 can receive the response to the request for the instance of the poll from the computing device of the given worker. The request, for example, can be a question to be posed as part of the poll. According to an illustration, the question included as part of the query can be "Are you a liberal arts major?" Following this illustration, the poll creation component 112 can generate a poll that includes such question. According to another example, the request can be a statement to be incorporated as part of the poll, where the statement can prompt for entry of a response by a worker. An illustration of a statement included as part of the query can be "Please enter your age, in years."

Pursuant to yet another example, the request can be a list of selectable choices for inclusion as part of the poll. As an illustration, the list of selectable choices included as part of the query can be "Please select one or more of the products you have purchased in the past three months: 1) Dog food ABC; 2) Dog food DEF; 3) Dog food QRS; 4) Dog food XYZ." Moreover, it is to be appreciated that other types of requests that prompt for entry of a response by a worker are intended to fall within the scope of the hereto appended claims.

Figure 2:
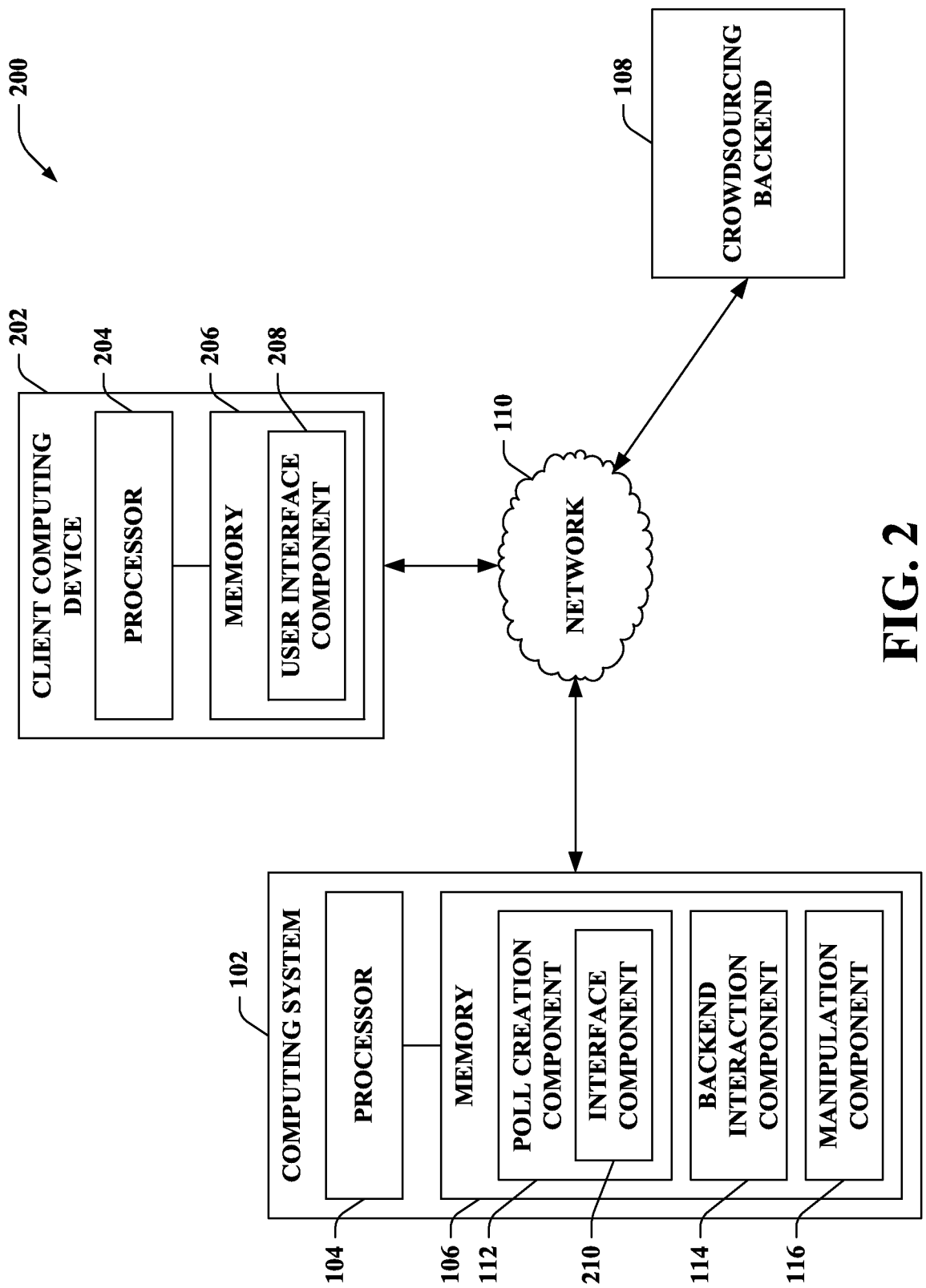
FIG. 2 illustrates a functional block diagram of an exemplary system that includes a client computing device that provides a query to a computing system as part of automated crowd-sourced polling.

The poll creation component 112 can receive the query from various sources. According to various examples, the poll creation component 112 can retrieve the query from the memory 106 or a data store of the computing system 102. Additionally or alternatively, pursuant to other examples, the poll creation component 112 can receive the query from a disparate computing system, a client computing device (as shown in FIG. 2), via a user interface, or the like.

According to various examples, the poll creation component 112 can perform query optimization and/or planning. Moreover, it is to be appreciated that the query or queries upon which the poll creation component 112 creates the poll can be part of a surrounding program, thereby allowing for optimizations that take advantage of context of the surrounding program.

The poll creation component 112, by automatically generating the poll based upon the at least one query, can enhance efficiency of a user (e.g., a developer, survey makers, pollster, etc.) who supplies the at least one query (e.g., the user can more efficiently provide the at least one query as compared to forming the poll using an interface, tool, etc. of the crowdsourcing backend 108). Further, queries used to generate polls for differing crowdsourcing backends can be similar (e.g., the queries can have a common format), while the electronic data structures of the polls for the differing crowdsourcing backends generated by the poll creation component 112 can have differing formats.

The memory 106 further includes a backend interaction component 114 that submits the poll to the crowdsourcing backend 108. The backend interaction component 114 can use the API of the crowdsourcing backend 108 to provide the poll to the crowdsourcing backend 108 (e.g., the crowdsourcing backend 108 can support scripting, etc.). Accordingly, instances of the poll can be administered on the crowdsourcing backend 108. Pursuant to an example, the backend interaction component 114 can specify a number of the instances of the poll to be administered on the crowdsourcing backend 108.

Moreover, the backend interaction component 114 can retrieve crowd-sourced responses to the instances of the poll from the crowdsourcing backend 108. The crowd-sourced responses to the instances of the poll respectively include crowd-sourced responses to the request.

The poll can be automatically generated by the poll creation component 112 and submitted to the crowdsourcing backend 108 by the backend interaction component 114 responsive to receipt of the query. Thus, the poll creation component 112 and the backend interaction component 114 can support on-demand polling via the crowdsourcing backend 108 to obtain the crowd-sourced responses to the instances of the poll.

The memory 106 also includes a manipulation component 116 that performs an operation (or operations) on the crowd-sourced responses to the instances of the poll. Examples of the operation can include one or more of a statistical analysis (e.g., hypothesis testing), bias correction, an arithmetic operation, expected value computation, standard deviation computation, etc. Further, the manipulation component 116 can output a result of the operation (or operations). Example outputs include displaying the result on a display screen of or coupled to the computing system 102, transmitting the result to a disparate computing system or a client computing device, retaining the result in a data store of the computing system 102, a combination thereof, and the like.

An operation performed by the manipulation component 116, for example, can be explicitly specified as part of a query. According to an illustration, an arithmetic operation to be performed on the crowd-sourced responses to the request can be included in a query. According to another example, the manipulation component 116 can select an operation to be performed based upon a query. Pursuant to an illustration, the manipulation component 116 can convert an if statement to a t-test.

More particularly, the manipulation component 116 can perform an operation (or operations) upon the crowd-sourced responses to the request. For example, the manipulation component 116 can convert the crowd-sourced responses to the request to a random variable. Further following this example, the manipulation component 116 can perform an operation upon the random variable. The manipulation component 116 can support reasoning about uncertainty, enabling t-tests, etc. on the random variable obtained from the crowdsourcing backend 108.

It is contemplated that the computing system 102 (e.g., the poll creation component 112, the backend interaction component 114, the manipulation component 116, etc.) can be used for research in various domains; examples of such domains include social sciences, political, marketing, health surveys, amongst others. The techniques described herein can enable a user (e.g., a developer, a survey maker, pollster, etc.) to more efficiently obtain statistically significant results while mitigating selection biases. In contrast, conventional approaches, while providing mechanisms for attracting crowd workers, building polls, and handling payment, oftentimes are unable to provide assistance for a user to obtain statistically significant results. Further, as described in greater detail below, bias correction and power analysis can be performed.

Now turning to FIG. 2, illustrated is a system 200 that includes a client computing device 202 that provides a query to the computing system 102 as part of automated crowd-sourced polling. The client computing device 202 and the computing system 102 are in communication by way of the network 110. Moreover, as described above, the computing system 102 is in communication with the crowdsourcing backend 108 by way of the network 110. Although not shown, according to other examples, it is contemplated that the computing system 102 can communicate with the client computing device 202 via a first network and the computing system 102 can communicate with the crowdsourcing backend 108 via a differing second network.

The client computing device 202 can be or include a desktop computing device, a mobile computing device (e.g., a laptop computing device, a mobile telephone, a tablet computing device, a wearable computing device, a handheld computing device, a portable gaming device, a personal etc.), a gaming console, an in-vehicle communications and infotainment system, or the like. The client computing device 202 includes a processor 204 and the memory 206. The processor 204 is configured to execute instructions loaded into the memory 206.

The memory 206 includes a user interface component 208 that generates output for a user of the client computing device 202 and/or receives input from a user of the client computing device 202. For instance, the user interface component 208 can cause a graphical user interface (e.g., text, images, video, etc.) to be displayed on a display screen of or coupled with the client computing device 202, sounds to be output via a speaker, a combination thereof, and so forth. Moreover, the user interface component 208 can receive input detected by one or more sensors (e.g., microphone, camera, wearable sensor, etc.), one or more input devices (e.g., keyboard, mouse, remote control, etc.), a combination thereof, and so forth.

The input received by the user interface component 208 can be indicative of at least one query that includes a request (or requests). For example, the user interface component 208 can receive a script that includes the at least one query. According to other examples, the at least one query can be created or derived based upon the input received by the user interface component 208; for instance, the client computing device 202 and/or the computing system 102 (e.g., the poll creation component 112) can create or derive the at least one query based upon such input.

Moreover, the poll creation component 112 of the computing system 102 can further include an interface component 210 that receives the query. The interface component 210 can receive the query from the client computing device 202. For example, the user interface component 208 of the client computing device 202 can receive the query, create the query, derive the query, etc.; following this example, the client computing device 202 can send the query to the computing system 102 by way of the network 110, and the interface component 210 can receive the query. According to another example, the user interface component 208 of the client computing device 202 can receive input, which can be transmitted to the computing system 102. Pursuant to this example, the interface component 210 can receive the input from the client computing device 202 and can create or derive the query based upon the input.

According to an example, the user interface component 208 of the client computing device 202 can receive a script (e.g., generated by a user of the client computing device 202) that includes at least one query. Following this example, the query can be expressed as a declarative language-integrated query; however, other types of queries are intended to fall within the scope of the hereto appended claims. Moreover, the interface component 210 of the computing system 102 can receive the script that includes the query. Following this example, the user interface component 208 and the interface component 210 can enable in-application scripting of crowd-sourced polls, which can provide a user of the client computing device 202 with streamlined access to crowd-sourced poll data. Further, by utilizing declarative language-integrated queries, such queries can be integrated with existing programs.

Language integration facilities of declarative language-integrated queries allow for integrating the crowdsourcing backend 108 as a provider of data within a program (e.g., the script), which can mitigate a need for domain-specific languages. A declarative language-integrated query over crowd data can be computed lazily, on demand, based upon computation (e.g., t-test, etc.) to be applied to query results, etc. The foregoing can enable code-sensitive query optimizations, customized to how the data is used within the program.

Below is pseudocode of various exemplary portions of scripts that include declarative language-integrated queries. However, it is to be appreciated that the claimed subject matter is not limited to the examples set forth below, which are provided for illustration purposes.

Example 1

The following pseudocode provides an example of filtering that can be performed as part of a poll.

```
1.   var people = new BackendAQueryable<Person>(true, 5, 100, 2);
2.   var liberalArtsPairs = from person in people
3.       where person.Employment == Employment.STUDENT
4.       select new {
5.           Person = person,
6.           Value = person.PoseQuestion<bool>(
7.               "Are you a liberal arts major?")
8.       };
```

The first line gets a handle to a population of users, in this case obtained from a crowdsourcing backend A (e.g., the crowdsourcing backend 108). Thus, the crowdsourcing backend is explicitly selected as part of this exemplary script. Each crowdsourcing backend has associated demographic information of the workers. In this example, line 3 includes a clause that causes students (e.g., college students) to be polled. The resulting poll generated by the poll creation component 112 will ask (college) students if they study liberal arts, producing an iterator of ⟨Student,bool⟩ pairs.

Example 2

Given liberalArtsPairs as provided in Example 1, a subsequent operation can be performed on the result (e.g., by the manipulation component 116). For instance, the manipulation component 116 can print out the pairs. Additionally or alternatively, the manipulation component 116 can use the Count operation to count the liberal arts majors. The below pseudocode depicts an example of use of the Count operation.

```
1.   var liberalArtMajorsCount =
2.       (from pair in liberalArtsPairs
3.       where pair.Value == true
4.       select person).Count( );
5.   double percentage = 100.0 * liberalArtMajorsCount /
6.       liberalArtsPairs .Count( );
```

In this example, lines 5 and 6 compute the percentage of liberal art majors within the population collected in Example 1.

Example 3

As described in greater detail herein, computing with uncertain data is explicitly supported by the techniques set forth herein. For example, the manipulation component 116 can convert crowd-sourced responses to requests to random variables, and can evaluate comparisons between the random variables as a t-test. The following pseudocode provides an example of programming with uncertainty.

```
1.   var liberalArtWomen = from person in people
2.       where person.Gender == Gender.FEMALE
3.       where person.Employment == Employment.STUDENT
4.       select person.PoseQuestion<bool>(
5.           "Are you a liberal arts major?");
6.
7.   var liberalArtMen = from person in people
8.       where person.Gender == Gender.MALE
9.       where person.Employment == Employment.STUDENT
10.      select person.PoseQuestion<bool>(
11.          "Are you a liberal arts major?");
12.
13.  var femaleVar = femaleSample.ToRandomVariable( );
14.  var maleVar = maleSampleList.ToRandomVariable( );
15.  if (femaleVar > maleVar) {
16.      Console.WriteLine("More female liberal arts majors .");
17.  }else{
18.      Console.WriteLine("More female liberal arts majors .");
19.  }
```

Here, the manipulation component 116 converts the Boolean output of the posted question to a random variable (lines 13 and 14). Then, line 15 provides a comparison between the random variables. The manipulation component 116 can compile the implicit>comparison on line 15 to a t-test on femaleVar and maleVar.

Example 4

The following exemplary pseudocode specifies an explicit t-test to be performed at a specified confidence interval.

```
1.   var test =
2.       maleSampleList.ToRandomVariable( ) >
3.       femaleSample.ToRandomVariable( );
4.
5.   if (test .AtConfidence(.95)) { ... }
```

As described in greater detail below (e.g., FIG. 4), the test and the confidence interval can be used to determine an outcome of a power analysis that can be performed to decide how many (male and female) subjects to poll.

Example 5

The below exemplary pseudocode can be used in connection with administering a marketing study of dog owners' preferences for Dog Food A. Specifically, this exemplary script can be used to evaluate if married women's attitude toward this product is more positive than that of married men.

```
1.   var DogFoodAWomen = from person in people
2.       where person.PoseQuestion<bool>("Are you a dog owner?")
3.           ==true
4.       where person.Gender == Gender.FEMALE
5.       where person.Relationship == Relationship.MARRIED
6.       select person.PoseQuestion<bool>(
7.           "Would you consider using Dog Food A?");
```

Similarly, for men:

```
1.   var DogFoodAMen = from person in people
2.       where person.PoseQuestion<bool>("Are you a dog owner?"))
3.           ==true
4.       where person.Gender == Gender.MEN
5.       where person.Relationship == Relationship.MARRIED
6.       select person.PoseQuestion<bool>(
7.           "Would you consider using Dog Food A?");
```

To compare these two, the following comparison may be used:

```
1.  if (DogFoodAWomen > DogFoodAMen) {
2.      Console.WriteLine("Women like Dog Food A more than men");
3.  }
```

Following this example, the poll creation component 112 can sample the population by sampling women first, and then sampling men. Alternatively, the poll creation component 112 can concurrently sample women and men (who are MARRIED) and to separate them into two streams: one for women, the other for men. Moreover, sampling from the same population is likely to yield a disproportional number of samples in either sub-population. For example, a percentage of workers of the crowdsourcing backend 108 who are women may differ from a percentage of women in a target population (e.g., United States population as represented by the census, etc.). Accordingly, the manipulation component 116 can correct for such bias, for instance.

Example 6

The below exemplary pseudocode illustrates integration of queries into a surrounding programming environment, which can allow a developer to mix polling of workers of the crowdsourcing backend 108 and computer computation.

```
1.  foreach ( string productName in products) {
2.      var women = ...;
3.      var men = ...;
4.      if (men > women) {
5.          Console.WriteLine("Women like {0} more", productName);
6.      }
7.  }
```

For instance, the for each loop can be used with a modified version of the pseudocode of Example 5 to test the respective fondness for a collection of products specified in a database.

While many of the examples set forth herein describe the user interface component 208 of the client computing device 202 receiving a script that includes one or more declarative language-integrated queries, it is to be appreciated that differing types of input (other than such a script) can be received by the user interface component 208. Accordingly, the examples provided herein describing utilization of scripting with declarative language-integrated queries can be extended to generation of queries utilizing a visual query builder, natural language interface, or the like.

Pursuant to an example, the user interface component 208 can generate a graphical user interface of a visual query builder (e.g., the memory 106 of the computing system 102 can include instructions configured to implement at least a portion of the visual query builder, the memory 206 of the client computing device 202 can include instructions configured to implement at least a portion of the visual query builder, disparate memory of a disparate computing system can include instructions configured to implement at least a portion of the visual query builder, etc.). Following this example, the user interface component 208 can receive an input via the graphical user interface of the visual query builder. The client computing device 202, for instance, can create a query (or queries) based upon the input received via the graphical user interface; thereafter, the client computing device 202 can transmit the query (or queries) to the computing system 102, and the interface component 210 of the computing system 102 can receive the query (or queries). According to another illustration, the client computing device 202 can transmit the input obtained via the graphical user interface of the visual query builder to the computing system 102, and the interface component 210 of the computing system 102 can receive such input obtained via the graphical user interface of the visual query builder; the interface component 210 (or the poll creation component 112 in general) can further create the query (or queries) based upon the input.

According to yet another example, the user interface component 208 can receive natural language data from a user (e.g., the natural language data can include spoken data, written data, etc.). It is to be appreciated that the memory 106 of the computing system 102 can include instructions configured to implement at least a portion of the natural language processing, the memory 206 of the client computing device 202 can include instructions configured to implement at least a portion of the natural language processing, disparate memory of a disparate computing system can include instructions configured to implement at least a portion of the natural language processing, or the like. Pursuant to an illustration, the client computing device 202 can derive a query (or queries) from the natural language data. Following this illustration, the client computing device 202 can transmit the query (or queries) to the computing system 102, and the interface component 210 can receive the query (or queries). In accordance with another illustration, the client computing device 202 can transmit the natural language data to the computing system 102; thus, the interface component 210 (or the poll creation component 112 in general) can receive the natural language data and derive the query (or queries) from the natural language data. Further, it is contemplated that gesture based input can similarly be received by the user interface component 208, and a query (or queries) can be derived based upon such gesture based input.

FIG. 3 illustrates the poll creation component 112 in greater detail. As noted above, the poll creation component 112 can include the interface component 210, which receives the query. Moreover, the poll creation component 112 can include a selection component 302 that selects a crowdsourcing backend (e.g., the crowdsourcing backend 108) from a plurality of possible crowdsourcing backends. More particularly, the plurality of possible crowdsourcing backends can include a crowdsourcing backend 1 304, . . . , and a crowdsourcing backend N 306 (collectively referred to as crowdsourcing backends 304-306), where N can be substantially any integer equal to or greater than two. The selection component 302 can select the crowdsourcing backend responsive to receipt of the query (e.g., by the interface component 210).

According to an example, the query received by the interface component 210 can specify a crowdsourcing backend from the plurality of crowdsourcing backends 304-306 (e.g., as depicted in Example 1 above). Thus, the selection component 302 can choose the crowdsourcing backend based upon the explicit indication received by the interface component 210.

According to another example, the selection component 302 can automatically select a crowdsourcing backend from the plurality of crowdsourcing backends 304-306. For instance, as part of query planning, the selection component 302 can choose an appropriate crowdsourcing backend for a poll to be administered (the poll includes a request). The selection component 302 can select the crowdsourcing backend from the plurality of crowdsourcing backends 304-306 as a function of the request, demographic information of respective crowds of workers of each of the possible crowdsourcing backends 304-306, respective costs of administering the poll on each of the possible crowdsourcing backends 304-306, latency parameters of the possible crowdsourcing backends 304-306, a combination thereof, and so forth. Further, crowdsourcing backend choices can be influenced by cost models supported by each of the crowdsourcing backends 304-306, overall numbers of participating workers, demand for work at a particular price level, a latency of task completion, or the like. Thus, the selection component 302 can enable automatically obtaining an appropriate crowd for the poll.

The polling techniques described herein can be run on substantially any crowdsourcing backend. According to an example, however, the selection component 302 can choose a crowdsourcing backend based upon a task to be performed. For instance, the selection component 302 can select a given crowdsourcing backend for a specialized task if the crowdsourcing backend supports special equipment, has workers with specific demographic information, or the like.

According to an example, the selection component 302 can obtain demographic information of workers from each of the crowdsourcing backends 304-306. For instance, the crowdsourcing backends 304-306 can supply the demographic information. Additionally or alternatively, the demographic information of workers of the crowdsourcing backends 304-306 can be obtained by explicitly asking demographic questions (e.g., gender, age, income, etc.) of workers of the crowdsourcing backends 304-306 (e.g., the selection component 302 can incorporate such demographic questions into polls that are generated even if not specified in the query received by the interface component 210). Further, the crowdsourcing backends 304-306 can cross-correlate provided demographic information to verify truthfulness of answers supplied by the workers; however, the claimed subject matter is not so limited.

Moreover, the poll creation component 112 can include a control component 308 that can plan and control execution of the query. The control component 308 can plan execution of the query based upon context of surrounding code nearby the query (e.g., in a received script, program, etc.), an explicit cost model for a crowd-based tasks, uncertainty, a combination thereof, and so forth. For instance, the control component 308 can plan execution of the query based upon costs of obtaining responses from workers of the crowdsourcing backend (e.g., the selected crowdsourcing backend chosen by the selection component 302), where such costs correspond to the workers being filtered by the crowdsourcing backend based upon respective subsets of characteristics of the workers. Moreover, the control component 308 can plan execution of the query based upon respective probabilities of the workers of the crowdsourcing backend having the characteristics. Further, the control component 308 can plan execution of the query based upon response latencies of workers of the crowdsourcing backend.

The cost structure for the crowdsourcing backend can differ from traditional query planning in databases. In particular, the cost can be a financial cost of hiring a requisite number of workers and having them complete instances of the polls. Given a cost model, the control component 308 can select a manner to execute a given query by running a portion of the query on the crowdsourcing backend and a portion locally on the computing system 102. Further, the control component 308 can determine a sequence of questions to ask and targeting restrictions to use for the poll.

Thus, the control component 308 can obtain a threshold level of certainty responses to a request while enabling costs for running the poll to be managed.

Below is exemplary pseudocode for a query. Again, it is to be appreciated that the pseudocode is provided for illustration purposes.

| 1. | from p in people |
| 2. | where p.Age > 50 |
| 3. | where p.Gender = Gender.FEMALE |
| 4. | select p.Age; |

Given the above query, the following plans are possible. To represent each plan, $\pi$ is indicative of a projection, $\sigma$ is indicative of a selection, and c is indicative of a crowd selection (e.g., a form of filtering performed by the crowdsourcing backend, often at a higher cost). The following table shows costs and probabilities for possible plans.

| Plan | Cost | Probability |
| --- | --- | --- |
| $\pi_{Age} \leftarrow \sigma_{Age} \leftarrow c_{Gender}$ | $0.10 | Pr[Age > 50] × Pr[FEMALE] |
| $\pi_{Age} \leftarrow \sigma_{Age} \leftarrow c_{Gender}$ | $0.50 | Pr[FEMALE] |
| $\pi_{Age} \leftarrow \sigma_{Age} \leftarrow c_{Gender}$ | $0.50 | Pr[Age > 50] |
| $\pi_{Age} \leftarrow \sigma_{Age} \leftarrow c_{Gender}$ | $1 | 1 |

The second column in the foregoing table indicates a cost of obtaining a worker matching the criteria from the crowdsourcing backend. In the above example, the cost of obtaining a worker over 50 years of age from the crowd is $0.50. The cost of obtaining a worker who is over 50 years of age and is female is $1.00. The right column indicates a probability of obtaining such a person in the crowd population. According to an illustration, from prior knowledge, the control component 308 can identify that a percentage of women in the crowd is 70%, thus making Pr[Age>50]=0.7.

It is generally the case that for effective planning, the control component 308 can use priors for a variety of joint distributions (e.g., what is the probability of finding a married male under 20 years of age?). For example, the control component 308 can consider possible plans based upon expected costs of each plan. The control component 308 can compute an expected cost for a plan by multiplying the cost of obtaining a response from a worker as filtered by the crowdsourcing backend by a probability of obtaining the worker.

According to various examples, it is contemplated that the control component 308 can predict a success rate of free-form questions; however, the claimed subject matter is not so limited.

Moreover, the control component 308 can perform various optimizations upon the query (or queries). For example, the control component 308 can perform dead code elimination; following this example, workers having desired demographic aspects for the query can be profiled. The control component 308 can recursively traverse the query to determine which demographic characteristics are of interest; accordingly, the control component 308 can compile a form with such demographic characteristics as part of the poll.

Further, the control component 308 can support performing a partial evaluation. Given that the queries can be used for hypothesis testing, a nature of the test can influence how the test is run. For example, the conditional on line 5 of the below exemplary pseudocode can be infeasible.

```
1.    var population50Plus =
2.       from person in people
3.       where person.Age > 50
4.       select person.Age;
5.    if (population50Plus < 20) { ... }
```

Since only workers 50 years or older are selected in line 3, the test of line 5 (involving an expected value of population 50) cannot be successful.

Pursuant to another example, the control component 308 can combine conditions. Thus, conditions of nested queries can be flattened. It is to be appreciated, however, that other optimizations can be performed by the control component 308 in addition to or instead of the foregoing examples.

Figure 4:
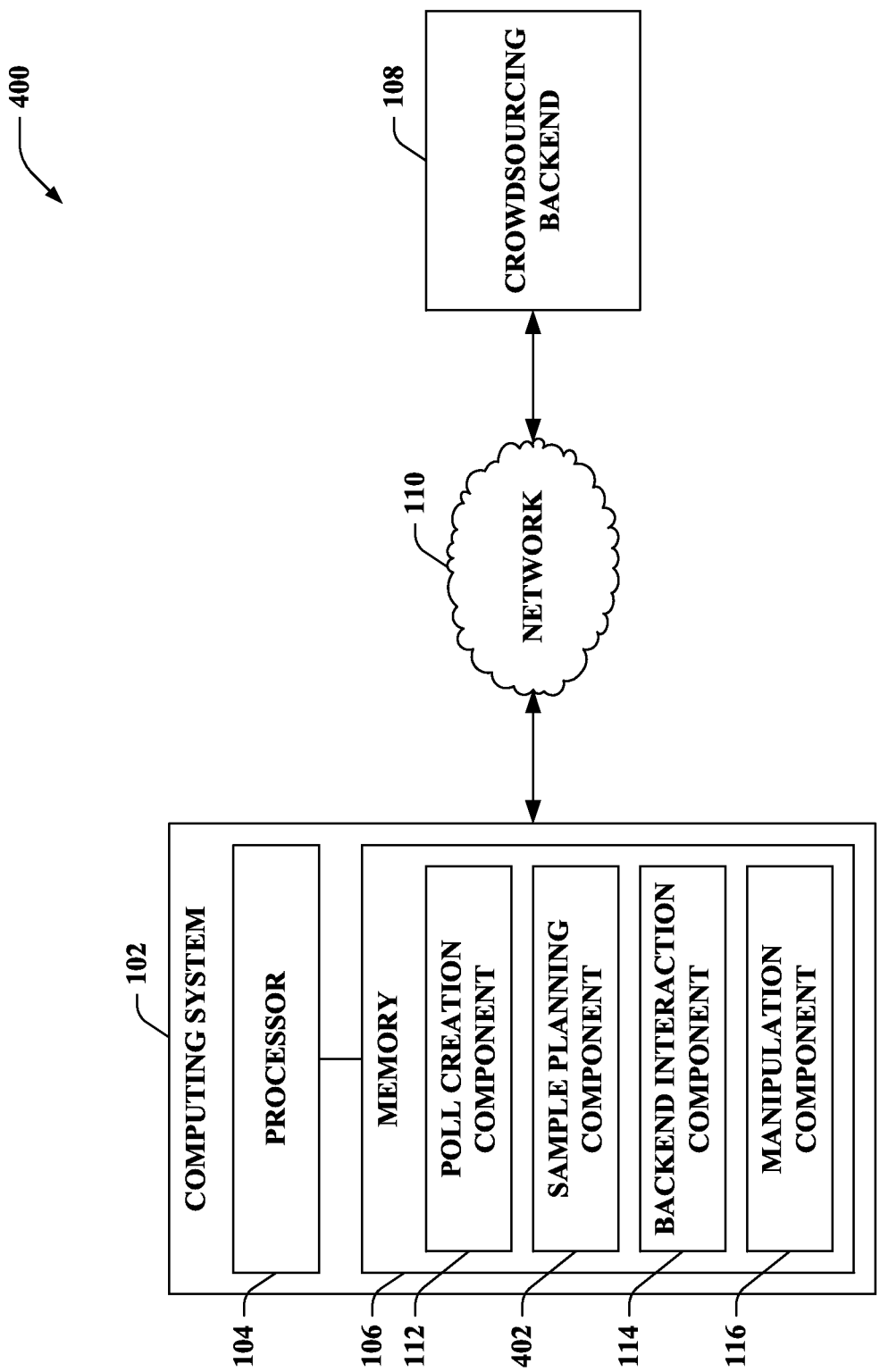
FIG. 4 illustrates a functional block diagram of an exemplary system that performs power analysis as part of automated crowd-sourced polling.

Turning to FIG. 4, illustrated is a system 400 that performs power analysis as part of automated crowd-sourced polling. In the example shown in FIG. 4, the memory 106 of the computing system 102 includes a sample planning component 402 that performs a power analysis based upon the query and a predefined significance criterion to compute a number of instances of the poll to administer on the crowdsourcing backend 108. Moreover, the backend interaction component 114 can cause the crowdsourcing backend 108 to administer the number of the instances of the poll determined by the sample planning component 402. The sample planning component 402 can further perform the power analysis based upon the operation (or operations) performed by the manipulation component 116. The sample planning component 402, for example, can use Bayesian power analysis to compute the number of instances the poll to administer on the crowdsourcing backend; however, the claimed subject matter is not so limited.

According to another example, the sample planning component 402 can additionally or alternatively determine whether to administer additional instances of the poll on the crowdsourcing backend 108 (e.g., a number of additional instances of the poll can be computed, a preset number of instances of the poll can be administered responsive to determining to administer additional instances of the poll, etc.).

The sample planning component 402 can perform the power analysis to determine the number of samples to be acquired to obtain a threshold level of statistical significance. Thus, the sample planning component 402 can enable efficient identification of the number of instances of the poll to be performed on the crowdsourcing backend 108 since polling too few workers can result in a lack of statistical significance, while polling too many workers can waste resources (e.g., additional expenses can be incurred to poll the additional workers).

Generally referring to FIGS. 3-4, the poll creation component 112 can generate a sampling strategy. The sampling strategy can include an identified crowdsourcing backend on which to administer the poll (e.g., the crowdsourcing backend 108), the number of instances of the poll to be administered, the plan for execution of the query or queries, a combination thereof, and so forth. Instances of the poll can be administered on the crowdsourcing backend 108 based on the sampling strategy. According to an example, the sampling strategy can be generated by the poll creation component 112 based on a power analysis (e.g., performed by the sample planning component 402) and demands of unbiasing a random variable (e.g., performed by a bias compensation component 504 of FIG. 5). Additionally or alternatively, the sampling strategy can be generated to attain a threshold level of statistical significance given a fixed cost budget for the poll.

Figure 5:
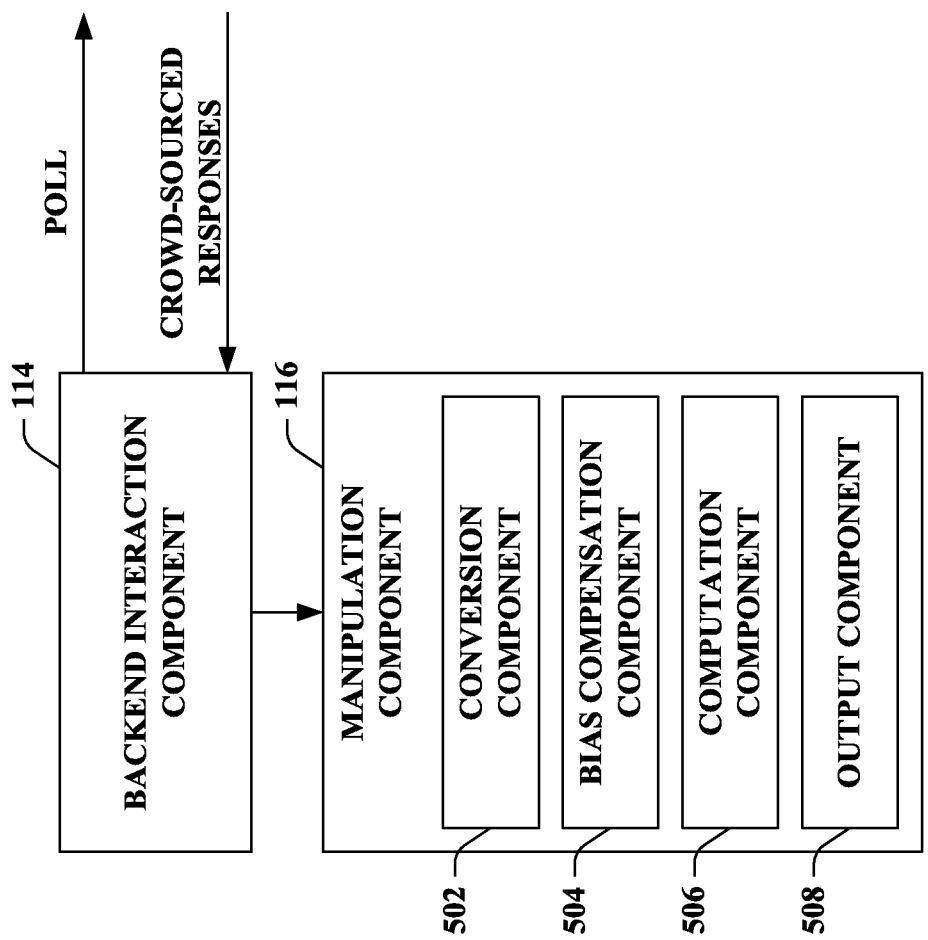
FIG. 5 illustrates a functional block diagram of an exemplary backend interaction component and an exemplary manipulation component.

FIG. 5 illustrates the backend interaction component 114 and the manipulation component 116 in greater detail. As described herein, the backend interaction component 114 can submit the poll to a crowdsourcing backend. The backend interaction component 114 can provide an indication of a number of instances of the poll to be administered on the crowdsourcing backend. Further, the backend interaction component 114 can receive crowd-sourced responses to the instances of the poll from the crowdsourcing backend.

As described herein, the poll includes a request. Further, the crowd-sourced responses to the instances of the poll respectively include crowd-sourced responses to the request. By way of illustration, the request can be a question such as "What is your height, in centimeters?" Following this illustration, the crowd-sourced responses to the request can include values indicating heights of workers supplied responsive to the instances of the poll.

The manipulation component 116 can further include a conversion component 502 that can convert the crowd-sourced responses to the request to a random variable. For instance, type Uncertain<T> can be natively supported by the conversion component 502, thereby allowing a developer to reason about population samples in a statistical setting directly within a general-purpose language.

The manipulation component 116 can further include a bias compensation component 504. The bias compensation component 504 can compute a bias corrected random variable for a target population based upon the random variable generated by the conversion component 502. The bias corrected random variable can be computed by the bias compensation component 504 as a function of demographic information of workers of the crowdsourcing backend, demographic information of the target population, and demographic information of workers that responded to the poll (e.g., workers who participated in the poll). Further, the bias compensation component 504 can compute the bias corrected random variable based upon the query (or queries) and the context of the query within a program (e.g., whether the query is within a conditional, etc.). The bias compensation component 504 can estimate and correct for biases and errors in the data collected from the crowdsourcing backend. Thus, the bias compensation component 504 can output the bias corrected random variable, which is representative of the target population rather than the captured sample population.

The demographic information of workers that responded to the poll can be obtained directly from the workers, from the crowdsourcing backend (e.g., as part of worker profile information, etc.), or the like. According to another example, the bias corrected random variable can be computed by the bias compensation component 504 as a function of the demographic information of the workers of the crowdsourcing backend for a time period during which the instances of the poll are administered.

The bias compensation component 504 can address selection biases, as well as non-response and coverage issues. It is contemplated that an input (e.g., user input) can control whether the bias corrected random variable computed by the bias compensation component 504 is utilized for subsequent operation(s) by the manipulation component 116.

Below is an example of unbiasing that can be performed by the bias compensation component 504. It is be appreciated, however, that the claimed subject matter is not limited to the following example.

Consider deciding if there are more female liberal art majors than there are male liberal art majors. The comparison can be performed via a t-test. However, a first task can be to determine an expected value of female and male liberal art majors given that S samples are obtained from the crowdsourcing backend.

The values can be computed as shown below:

$$E[L_W|C]=Pr[L|W_C] \times Pr[W_C|W_W] \times S$$

$$E[L_M|C]=Pr[L|M_C] \times Pr[M_C|M_W] \times S$$

In the foregoing, $L_W$ and $L_M$ represent the number of female and male liberal art majors, respectively. Moreover, $W_C$ and $M_C$ respectively represent a woman or man being in the crowd. Further, $W_W$ and $M_W$ respectively represent a woman or man being in a target population (e.g., United States population as represented by census data).

The bias compensation component 504 can discern an expected value of liberal art majors per gender in the target population. More particularly, the bias compensation component 504 can unbias a random variable by using the probability of observing a woman in the crowd given there is a woman in the target population:

$$E[W_L|W]=E[W_L|C] \times P(W_C|W_W)$$

Similarly, for men, the bias compensation component 504 can evaluate the following:

$$E[M_L|M]=E[M_L|C] \times P(M_C|M_W).$$

While $E[W_L|C]$ and $E[M_L|C]$ can be approximated by observing the crowd-sourced results for the female and male sub-segments of the population, coefficients such as $P(W_C|W_W)$ can be computed from knowledge of the crowd population versus that in the target population in general. For example, if women:men are at 50%:50% in the target population and that 30%:70% in the crowd, then $P(W_C|W_W)$ =0.7 and $P(M_C|W_W)$=0.3.

Again, it is noted that the claimed subject matter is not limited to the above example. For instance, it is contemplated that the bias compensation component 504 can use a model that explicitly represents ignorability.

Pursuant to an example, it is contemplated that the bias compensation component 504 can compute a bias corrected random variable for a target population before performance of a statistical analysis such as a t-test (e.g., by a computation component 506 as set forth below). Likewise, a disparate random variable being compared to the random variable in a t-test can similarly be bias corrected by the bias compensation component 504 before the performance of the statistical analysis. Computation of the bias corrected random variable and a disparate bias corrected random variable can enable reshaping the underlying distributions.

The manipulation component 116 can further include a computation component 506 that performs one or more operations upon the random variable. For instance, the computation component 506 can perform a statistical analysis upon the random variable. An example of the statistical analysis is hypothesis testing. According to other examples, the computation component 506 can perform one or more of an arithmetic operation on the random variable, compute an expected value of the random variable, compute a standard deviation of the random variable, or the like. Treating crowd-generated data as distributions can enable the computation component 506 to compute expected values, standard deviations, or the like.

The computation component 506 can perform an operation upon the random variable (e.g., without bias correction being performed by the bias compensation component 504). Additionally or alternatively, the computation component 506 can perform an operation on the bias corrected random variable generated by the bias compensation component 504.

The manipulation component 116 can further include an output component 508 that can output a result of the operation (or operations) performed by the computation component 506. For instance, the output component 508 can cause the result be displayed on a display screen, transmitted to a disparate computing system (e.g., the client computing device 202 of FIG. 2), retained in a data store, or the like. According to an illustration, the computation component 506 can perform a statistical analysis (e.g., hypothesis testing) upon the random variable (e.g., the bias corrected random variable, etc.). Further, the computation component 506 can generate a decision based on a result of the statistical analysis. The output component 508 can output information indicative of the decision.

According to an example, the at least one query obtained by the poll creation component 112 can include a request and a disparate request. Moreover, the at least one query can include an indication to perform a comparison between crowd-sourced responses to the request and crowd-sourced responses to the disparate request. Accordingly, the crowd-sourced responses to the request and the crowd-sourced responses to the disparate request can be received from the crowdsourcing backend by the backend interaction component 114. Moreover, the conversion component 502 can convert the crowd-sourced responses to the request to a random variable and the crowd-sourced responses to the disparate request to a disparate random variable. The bias compensation component 504 can unbias the random variable and the disparate random variable, thereby computing a bias corrected random variable and a disparate bias corrected random variable; however, the claimed subject matter is not so limited. Further, the computation component 506, responsive to the indication to perform the comparison, can perform a t-test upon the random variable and the disparate random variable. The computation component 506 can convert an if statement on two random variables to a t-test, for example. Responsive to performance of the t-test, a result of the t-test can be output by the output component 508.

Figure 6:
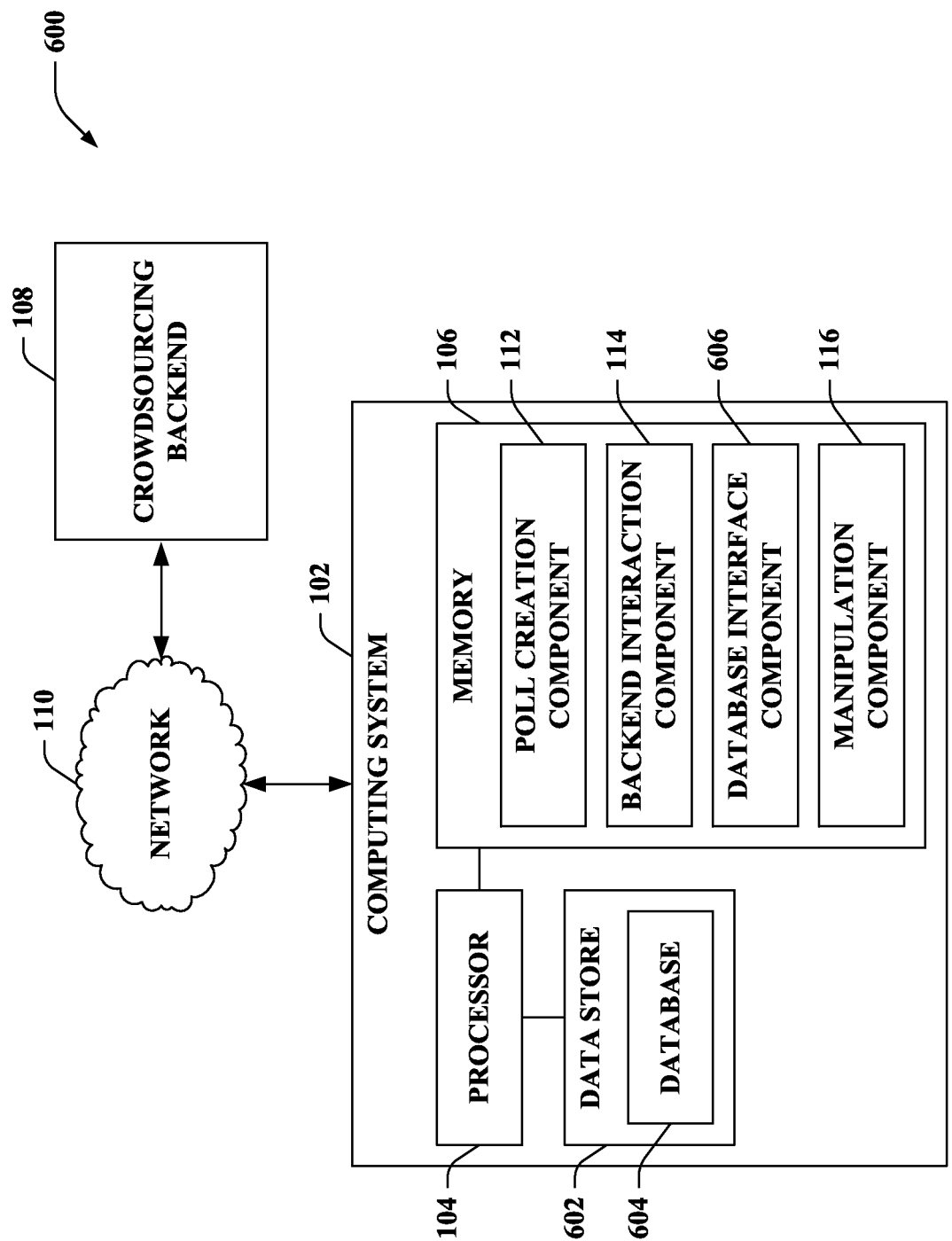
FIG. 6 illustrates a functional block diagram of an exemplary system that integrates automated crowd-sourced polling with performance of disparate computing operations specified in a program.

Turning to FIG. 6, illustrated is a system 600 that integrates automated crowd-sourced polling with performance of disparate computing operations specified in a program. In the example depicted in FIG. 6, the computing system 102 further includes a data store 602 that retains a database 604. According to other examples, a disparate computing system can additionally or alternatively include the database 604 (or a portion thereof).

The memory 106 of the computing system 102 further includes a database interface component 606. The database interface component 606 can extract data from the database 604 based upon the query (or queries) received by the poll creation component 112 (e.g., similar to Example 6 above). Moreover, the manipulation component 116 can perform a disparate operation upon the data extracted from the database 604.

Turning to FIG. 7, illustrated is an exemplary graphical user interface 700 depicting an instance of a poll. The graphical user interface 700 can be displayed on a display screen of a computing device of a worker of the crowdsourcing backend 108. Thus, the computing device of the worker can receive input responsive to the graphical user interface 700.

According to an example, the poll creation component 112 can receive the following exemplary queries; based upon such queries, the poll creation component 112 can generate the poll, the poll can be submitted to the crowdsourcing backend 108, the crowdsourcing backend 108 can send the poll to the computing device of the worker, and the computing device of the worker can display the graphical user interface 700 for the instance of the poll.

```
1.   var femaleHeight =
2.      from person in people
3.      where person.Gender == Gender.FEMALE
4.      select person.PoseQuestion<int>(
5.         "What is your height, in centimeters?");
6.   var maleHeight =
7.      from person in people
8.      where person.Gender == Gender.MALE
9.      select person.PoseQuestion<int>(
10.        "What is your height, in centimeters?");
11.  if (maleHeight.ToRandomVariable( ) >
        femaleHeight.ToRandomVariable( )) {
12.     Console.WriteLine(
13.        "Males are taller than females, according to t-test.");
14.  }
```

As shown in FIG. 7, the graphical user interface 700 includes a title region 702 and a poll information region 704. The poll information region 704 can include information such as a name of a requester, an expiration time and date for the poll, a reward for completion of the poll, a number of instances of the poll to be administered, and a description of the poll. Moreover, based upon the foregoing exemplary queries, the graphical user interface 700 includes a first request region 706 and a second request region 708. The first request region 706 prompts the worker to enter his or her gender. The second request region 708 prompts the worker to enter his or her height, in centimeters. User input can be received via a field 710 in the first request region 706 and a field 712 in the second request region 708.

Responsive to receipt of input from the worker via the fields 710 and 712 (as well as the disparate workers conducting the poll), the manipulation component 116 can convert the responses for females and males to random variables. Moreover, the manipulation component 116 can compare such responses utilizing a t-test to determine whether males or females are taller. If males are determined to be taller than females, then "Males are taller than females, according to t-test" can be output (e.g., displayed on a display screen of a user who supplied the queries).

Figure 8:
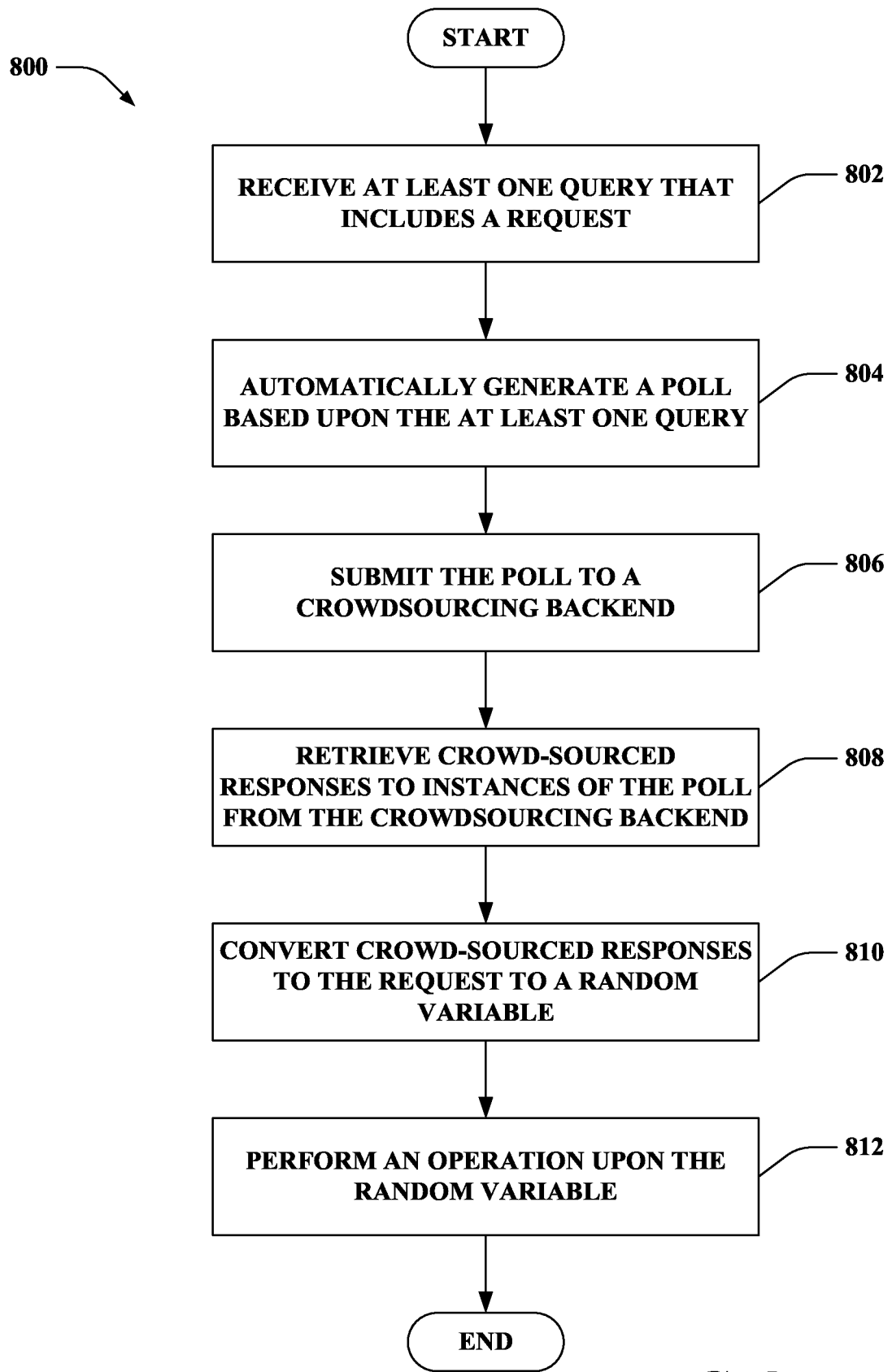
FIG. 8 is a flow diagram that illustrates an exemplary methodology for automation of crowd-sourced polling.
Figure 9:
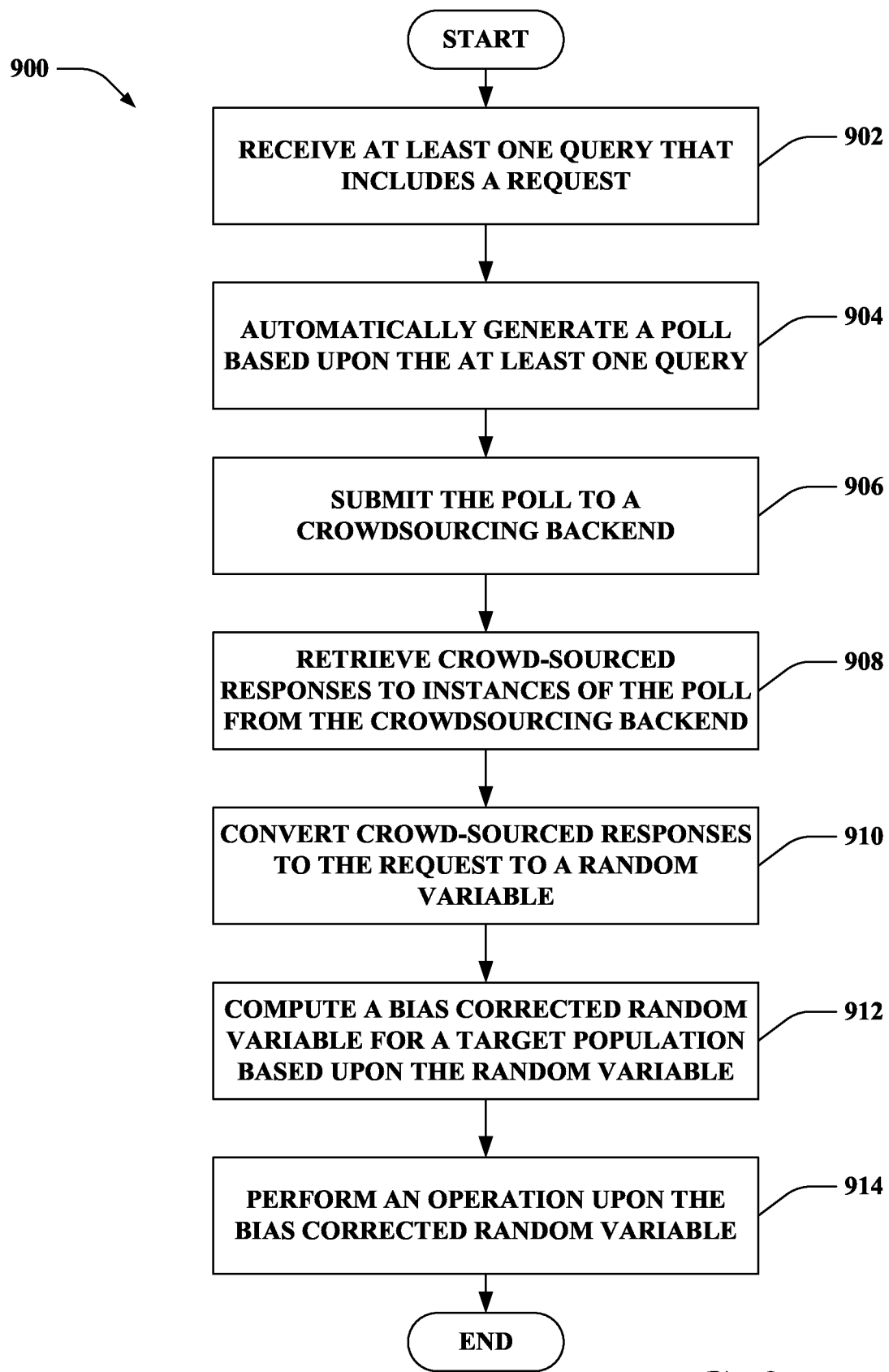
FIG. 9 is a flow diagram that illustrates an exemplary methodology for obtaining an unbiased result as part of automated crowd-sourced polling.
Figure 10:
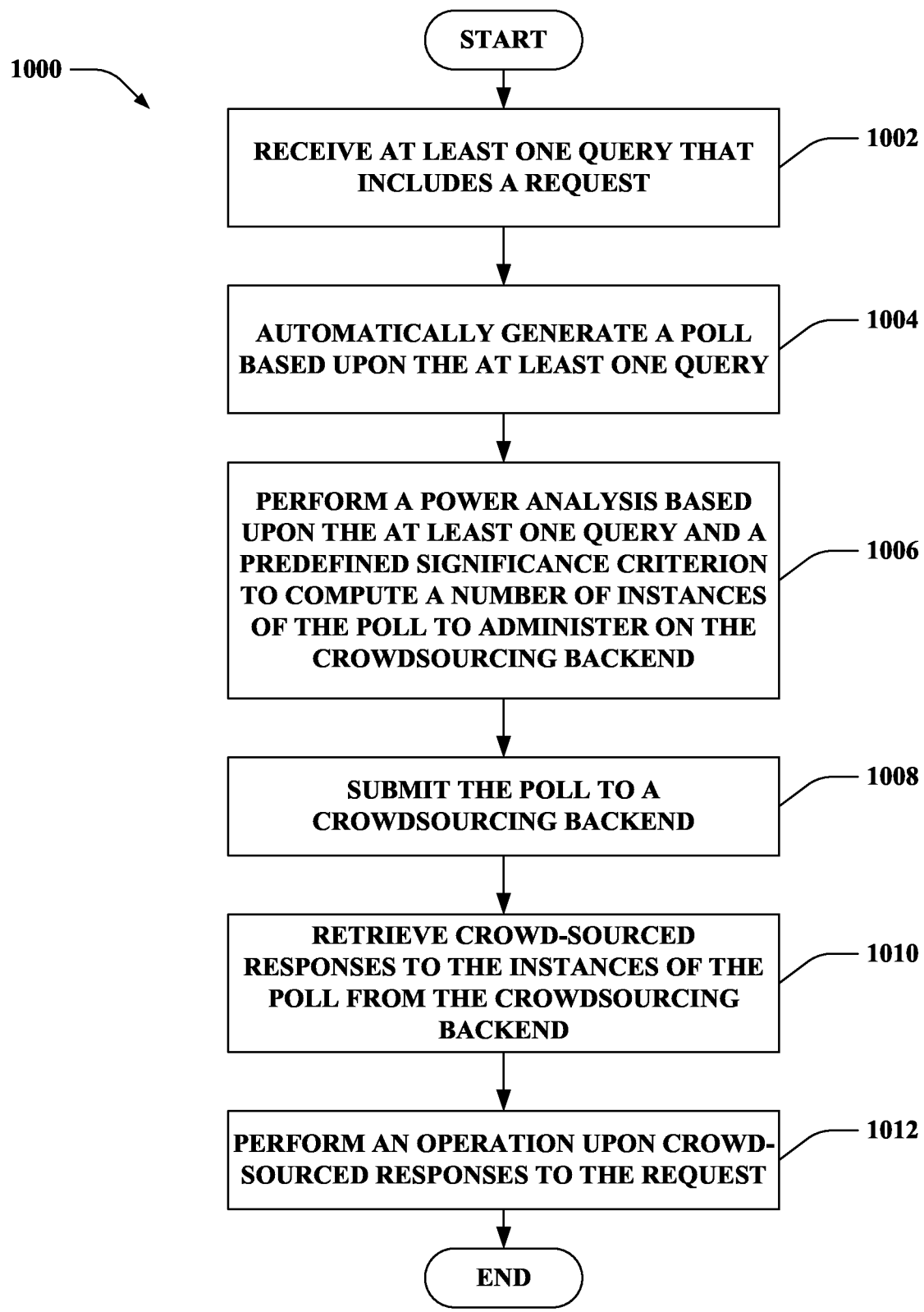
FIG. 10 is a flow diagram that illustrates an exemplary methodology for automating crowd-sourced polling with a determined sample size.

FIGS. 8-10 illustrate exemplary methodologies relating to automating crowd-sourced polling. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 for automation of crowd-sourced polling. At 802, at least one query can be received. The at least one query includes a request. At 804, a poll can be automatically generated based upon the at least one query. The poll corresponds to the request (e.g., the poll include can include the request). At 806, the poll can be submitted to a crowdsourcing backend. Instances of the poll are administered on the crowdsourcing backend. At 808, crowd-sourced responses to the instances of the poll can be retrieved from the crowdsourcing backend. The crowd-sourced responses to the instances of the poll respectively include crowd-sourced responses to the request. At 810, the crowd-sourced responses to the request can be converted to a random variable. At 812, an operation can be performed upon the random variable.

Turning to FIG. 9, illustrated is a methodology 900 for obtaining an unbiased result as part of automated crowd-sourced polling. At 902, at least one query can be received, where the at least one query includes a request. At 904, a poll can be automatically generated based upon the at least one query, where the poll corresponds to the request (e.g., the poll can include the request). At 906, the poll can be submitted to a crowdsourcing backend. At 908, crowd-sourced responses to instances of the poll can be retrieved from the crowdsourcing backend. The crowd-sourced responses to the instances of the poll respectively include crowd-sourced responses to the request. At 910, the crowd-sourced responses to the request can be converted to a random variable. At 912, a bias corrected random variable for a target population can be computed based upon the random variable. At 914, an operation can be performed upon the bias corrected random variable.

With reference to FIG. 10, illustrated is a methodology 1000 for automating crowd-sourced polling with a determined sample size. At 1002, at least one query that includes a request can be received. At 1004, a poll can be automatically generated based upon the at least one query. The poll corresponds to the request (e.g., the poll can include the request). At 1006, a power analysis can be performed based upon the query and a predefined significance criterion to compute a number of instances of the poll to administer on a crowdsourcing backend. At 1008, the poll can be submitted to a crowdsourcing backend. The number of instances of the poll as computed can be administered on the crowdsourcing backend. At 1010, crowd-sourced responses to the instances of the poll can be retrieved from the crowdsourcing backend. The crowd-sourced responses to the instances of the poll respectively include crowd-sourced responses to the request. At 1012, an operation can be performed upon the crowd-sourced responses to the request.

Figure 11:
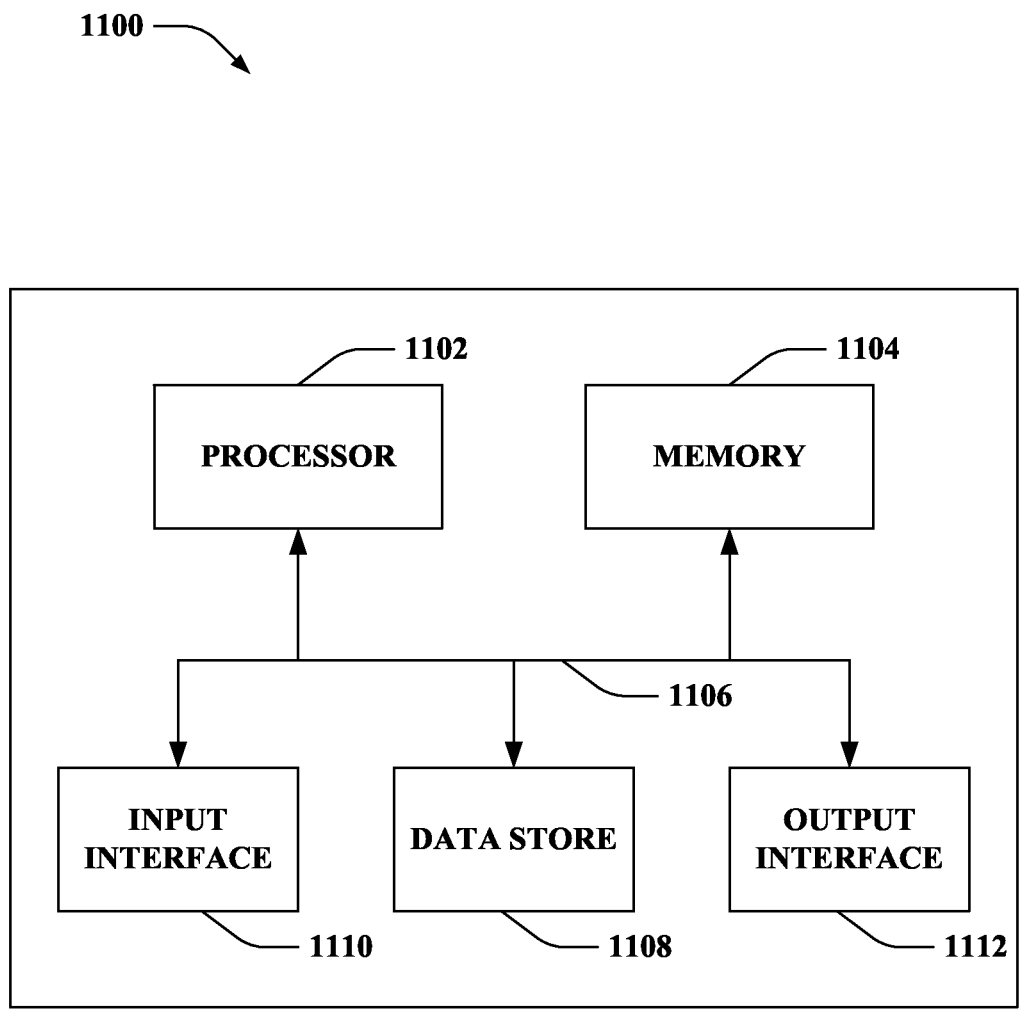
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be the computing system 102. According to another example, the computing system 102 can include one or more computing devices, which can each be substantially similar to the computing device 1100. Pursuant to another example, the computing device 1100 can be the client computing device 202. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store a script, one or more queries, a poll, crowd-sourced responses to instances of the poll, random variable(s), and so forth.

The computing device 1100 additionally includes a data store 1108 that is accessible by the processor 1102 by way of the system bus 1106. The data store 1108 may include executable instructions, a script, one or more queries, a poll, crowd-sourced responses to instances of the poll, random variable(s), a database, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Figure 12:
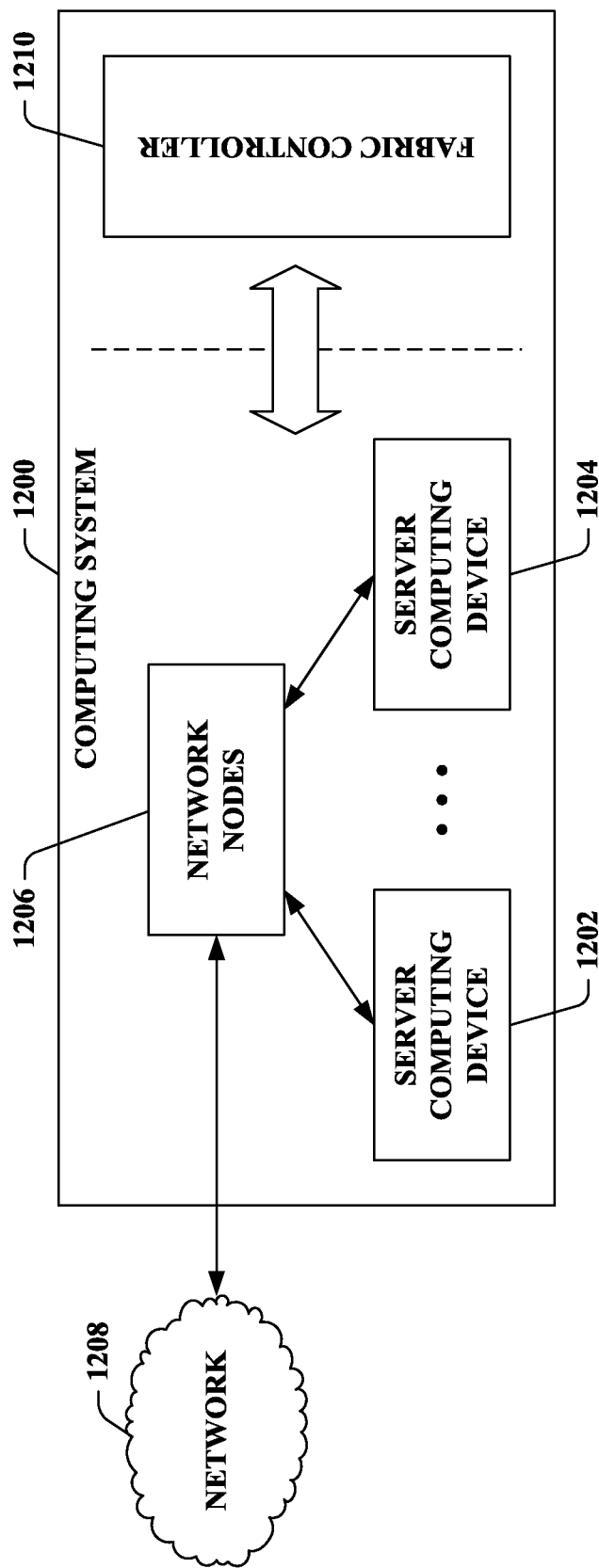
FIG. 12 illustrates an exemplary computing system.

Turning to FIG. 12, a high-level illustration of an exemplary computing system 1200 that can be used in accordance with the systems and methodologies disclosed herein is illustrated. For instance, the computing system 1200 can be or include the computing system 102. Additionally or alternatively, the computing system 102 can be or include the computing system 1200.

The computing system 1200 includes a plurality of server computing devices, namely, a server computing device 1202, . . . , and a server computing device 1204 (collectively referred to as server computing devices 1202-1204). The server computing device 1202 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1202, at least a subset of the server computing devices 1202-1204 other than the server computing device 1202 each respectively include at least one processor and a memory. Moreover, at least a subset of the server computing devices 1202-1204 include respective data stores.

Processor(s) of one or more of the server computing devices 1202-1204 can be or include the processor 104. Further, a memory (or memories) of one or more of the server computing devices 1202-1204 can be or include the memory 106. Moreover, a data store (or data stores) of one or more of the server computing devices 1202-1204 can be or include the data store 602.

The computing system 1200 further includes various network nodes 1206 that transport data between the server computing devices 1202-1204. Moreover, the network nodes 1202 transport data from the server computing devices 1202-1204 to external nodes (e.g., external to the computing system 1200) by way of a network 1208. The network nodes 1202 also transport data to the server computing devices 1202-1204 from the external nodes by way of the network 1208. The network 1208, for example, can be the Internet, a cellular network, or the like. The network nodes 1206 include switches, routers, load balancers, and so forth.

A fabric controller 1210 of the computing system 1200 manages hardware resources of the server computing devices 1202-1204 (e.g., processors, memories, data stores, etc. of the server computing devices 1202-1204). The fabric controller 1210 further manages the network nodes 1206. Moreover, the fabric controller 1210 manages creation, provisioning, de-provisioning, and supervising of virtual machines instantiated upon the server computing devices 1202-1204.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for automation of crowd-sourced polling, comprising:
   receiving at least one query at a computing system, the at least one query comprises a request, the computing system being separate from and in communication with a crowdsourcing backend via a network;
   automatically generating a poll based upon the at least one query, the poll corresponding to the request, the poll being automatically generated by the computing system, and the poll being automatically generated to have a format for submission to the crowdsourcing backend;
   identifying a number of instances of the poll to administer to workers prior to submission of the poll to the crowdsourcing backend, the number of the instances being identified by the computing system based on an operation to be performed on crowd-sourced responses to the request;
   submitting the poll to the crowdsourcing backend such that the number of the instances of the poll are caused to be administered, the poll being submitted by the computing system to the crowdsourcing backend via the network, wherein the poll is posted as a task on the crowdsourcing backend and the number of the instances of the poll are administered to the workers on the crowdsourcing backend;
   responsive to submitting the poll to the crowdsourcing backend, receiving crowd-sourced responses to the instances of the poll at the computing system from the crowdsourcing backend via the network, the crowd-sourced responses to the instances of the poll respectively comprise the crowd-sourced responses to the request;
   converting the crowd-sourced responses to the request to a random variable;
   computing a bias corrected random variable for a target population based upon the random variable, a portion of the workers of the crowdsourcing backend having a particular value of a demographic characteristic, and a portion of the target population having the particular value of the demographic characteristic;
   performing the operation on the bias corrected random variable; and
   outputting a result of the operation utilizing the computing system.

2. The method of claim 1, the at least one query being expressed as at least one declarative language-integrated query.

3. The method of claim 1, receiving the at least one query further comprises:
   receiving an input obtained via a graphical user interface of a visual query builder; and
   creating the at least one query based upon the input obtained via the graphical user interface.

4. The method of claim 1, receiving the at least one query further comprises:
   receiving natural language user input data; and
   deriving the at least one query from the natural language user input data.

5. The method of claim 1, wherein identifying the number of the instances of the poll to administer on the crowdsourcing backend prior to submission of the poll to the crowdsourcing backend further comprises:
   performing a power analysis based on the at least one query, the operation, and a predefined statistical significance criterion to compute the number of the instances of the poll to administer on the crowdsourcing backend.

6. The method of claim 1, further comprising generating a sampling strategy based on a power analysis and demands of unbiasing the random variable, the sampling strategy being generated by the computing system;
   wherein the poll is submitted by the computing system to the crowdsourcing backend such that the instances of the poll are administered on the crowdsourcing backend based on the sampling strategy.

7. The method of claim 1, further comprising generating a sampling strategy that attains a threshold level of statistical significance given a fixed cost budget for the poll, the sampling strategy being generated by the computing system;
   wherein the poll is submitted by the computing system to the crowdsourcing backend such that the instances of the poll are administered on the crowdsourcing backend based on the sampling strategy.

8. The method of claim 1, performing the operation on the bias corrected random variable further comprises:
   performing a statistical analysis upon the bias corrected random variable; and
   generating a decision based on a result of the statistical analysis.

9. The method of claim 1, wherein the at least one query comprises a disparate request and an indication to perform a comparison between the crowd-sourced responses to the request and crowd-sourced responses to the disparate request, the method further comprising:
   responsive to submitting the poll to the crowdsourcing backend, receiving the crowd-sourced responses to the disparate request from the crowdsourcing backend at the computing system;
   converting the crowd-sourced responses to the disparate request to a disparate random variable;

computing a disparate bias corrected random variable for a target population based at least in part on the disparate random variable;

responsive to the indication to perform the comparison, performing a t-test upon the bias corrected random variable and the disparate bias corrected random variable; and outputting a result of the t-test.

10. The method of claim 1, performing the operation on the bias corrected random variable further comprises:
at least one of:
performing an arithmetic operation on the bias corrected random variable;
computing an expected value of the bias corrected random variable; or
computing a standard deviation of the bias corrected random variable.

11. The method of claim 1, further comprising selecting the crowdsourcing backend from a plurality of possible crowdsourcing backends, the crowdsourcing backend selected by the computing system responsive to receipt of the at least one query.

12. The method of claim 9, the crowdsourcing backend selected from the plurality of possible crowdsourcing backends as a function of one or more of the request, demographic information of respective crowds of workers of each of the possible crowdsourcing backends, respective costs of administering the poll on each of the possible crowdsourcing backends, or latency parameters of the possible crowdsourcing backends.

13. The method of claim 1, further comprising:
planning execution of the at least one query, the execution of the at least one query being planned by the computing system based upon:
costs of obtaining responses from the workers of the crowdsourcing backend, the costs corresponding to the workers being filtered by the crowdsourcing backend based upon respective subsets of characteristics of the workers;
respective probabilities of the workers of the crowdsourcing backend having the characteristics; and
response latencies of the workers of the crowdsourcing backend; and
controlling the execution of the at least one query as planned.

14. A computing system, the computing system being separate from and in communication with a crowdsourcing backend via a network, the computing system comprising:
at least one processor; and
memory that comprises computer-executable instructions that, when executed by the at least one processor, cause the at least one processor to perform acts including:
automatically generating a poll for the crowdsourcing backend based upon at least one query, the at least one query comprises a request, the poll corresponds to the request, and the poll being automatically generated to have a format for submission to the crowdsourcing backend;
performing a power analysis based upon the at least one query, an operation to be performed on crowd-sourced responses to the request, and a predefined significance criterion to compute a number of instances of the poll to administer to workers prior to submission of the poll to the crowdsourcing backend;
submitting the poll to the crowdsourcing backend via the network such that the number of instances of the poll are caused to be administered, wherein the poll is posted as a task on the crowdsourcing backend and the number of the instances of the poll are administered to the workers on the crowdsourcing backend;
responsive to submitting the poll to the crowdsourcing backend, receiving crowd-sourced responses to the instances of the poll from the crowdsourcing backend via the network, the crowd-sourced responses to the instances of the poll respectively comprise crowd-sourced responses to the request;
converting the crowd-sourced responses to the request to a random variable;
computing a bias corrected random variable for a target population based upon the random variable, a portion of the workers of the crowdsourcing backend having a particular value of a demographic characteristic, and a portion of the target population having the particular value of the demographic characteristic;
performing an operation upon the bias corrected random variable; and
outputting a result of the operation.

15. The computing system of claim 14, wherein the computing system receives the at least one query from a client computing device.

16. A computing system, the computing system being separate from and in communication with a crowdsourcing backend via a network, the computing system comprising:
at least one processor; and
memory that comprises computer-executable instructions that, when executed by the at least one processor, cause the at least one processor to perform acts including:
receiving at least one query, the at least one query comprises a request;
automatically generating a poll based upon the at least one query, the poll corresponding to the request, and the poll being automatically generated to have a format for submission to the crowdsourcing backend;
identifying a number of instances of the poll to administer to workers prior to submission of the poll to the crowdsourcing backend, the number of the instances being identified based on an operation to be performed;
submitting the poll to the crowdsourcing backend via the network such that the number of the instances of the poll are caused to be administered, wherein the poll is posted as a task on the crowdsourcing backend and the number of the instances of the poll are administered to the workers on the crowdsourcing backend;
responsive to submitting the poll to the crowdsourcing backend, receiving crowd-sourced responses to the instances of the poll from the crowdsourcing backend via the network, the crowd-sourced responses to the instances of the poll respectively comprise crowd-sourced responses to the request;
converting the crowd-sourced responses to the request to a random variable;
computing a bias corrected random variable for a target population based upon the random variable, a portion of the workers of the crowdsourcing backend having a particular value of a demographic characteristic, and a portion of the target population having the particular value of the demographic characteristic;

performing the operation upon the bias corrected random variable; and outputting a result of the operation.

17. The computing system of claim 16, wherein identifying the number of the instances of the poll to administer on the crowdsourcing backend prior to submission of the poll to the crowdsourcing backend further comprises:

performing a power analysis based on the at least one query, the operation, and a predefined statistical significance criterion to compute the number of the instances of the poll to administer on the crowdsourcing backend.

18. The computing system of claim 16, the memory further comprises computer-executable instructions that, when executed by the at least one processor, cause the at least one processor to perform acts including:

selecting the crowdsourcing backend from a plurality of possible crowdsourcing backends, the crowdsourcing backend selected by the computing system responsive to receipt of the at least one query.

19. The computing system of claim 16, the memory further comprises computer-executable instructions that, when executed by the at least one processor, cause the at least one processor to perform acts including:

planning execution of the at least one query, the execution of the at least one query being planned based upon:

costs of obtaining responses from the workers of the crowdsourcing backend, the costs corresponding to the workers being filtered by the crowdsourcing backend based upon respective subsets of characteristics of the workers;

respective probabilities of the workers of the crowdsourcing backend having the characteristics; and response latencies of the workers of the crowdsourcing backend; and controlling the execution of the at least one query as planned.

20. The computing system of claim 16, the memory further comprises computer-executable instructions that, when executed by the at least one processor, cause the at least one processor to perform acts including:

generating a sampling strategy, wherein the poll is submitted to the crowdsourcing backend such that the instances of the poll are administered on the crowdsourcing backend based on the sampling strategy.

* * * * *